(12) United States Patent
Bigot-Astruc et al.

(10) Patent No.: US 8,879,878 B2
(45) Date of Patent: Nov. 4, 2014

(54) MULTIMODE OPTICAL FIBER

(75) Inventors: Marianne Bigot-Astruc, Marcoussis (FR); Denis Molin, Draveil (FR); Pierre Sillard, Le Chesnay (FR)

(73) Assignee: Draka Comteq, B.V., Amsterdam (NL)

( * ) Notice: Subject to any disclaimer, the term of this patent is extended or adjusted under 35 U.S.C. 154(b) by 307 days.

(21) Appl. No.: 13/534,793

(22) Filed: Jun. 27, 2012

(65) Prior Publication Data
US 2013/0004135 A1 Jan. 3, 2013

Related U.S. Application Data

(60) Provisional application No. 61/503,773, filed on Jul. 1, 2011.

(30) Foreign Application Priority Data

Jul. 1, 2011 (EP) .................................. 11305851

(51) Int. Cl.
*G02B 6/036* (2006.01)
*G02B 6/028* (2006.01)

(52) U.S. Cl.
CPC .......... *G02B 6/0288* (2013.01); *G02B 6/03683* (2013.01); *G02B 6/0365* (2013.01); *G02B 6/03605* (2013.01)
USPC ....................................... 385/126

(58) Field of Classification Search
None
See application file for complete search history.

(56) References Cited

U.S. PATENT DOCUMENTS

| | | |
|---|---|---|
| 4,111,525 A | 9/1978 | Kaminow et al. |
| 4,184,744 A | 1/1980 | Onoda et al. |
| 4,222,631 A | 9/1980 | Olshansky |
| 4,229,070 A | 10/1980 | Olshansky et al. |
| 4,230,396 A | 10/1980 | Olshansky et al. |
| RE30,635 E | 6/1981 | Kuppers et al. |
| 4,314,833 A | 2/1982 | Kuppers |
| 4,339,174 A | 7/1982 | Levin |
| 4,406,517 A | 9/1983 | Olshansky |
| 4,465,335 A | 8/1984 | Eppes |
| 4,636,235 A | 1/1987 | Glessner et al. |
| 4,636,236 A | 1/1987 | Glessner et al. |
| 4,653,042 A | 3/1987 | d'Auria et al. |
| 4,715,695 A | 12/1987 | Nishimura et al. |
| 4,723,828 A | 2/1988 | Garel-Jones et al. |
| 4,838,643 A | 6/1989 | Hodges et al. |

(Continued)

FOREIGN PATENT DOCUMENTS

| | | |
|---|---|---|
| EP | 1921478 A1 | 5/2008 |
| EP | 2166386 A1 | 3/2010 |

(Continued)

OTHER PUBLICATIONS

European Search Report in counterpart European Application No. 11305851 dated Sep. 26, 2011, pp. 1-6.

(Continued)

*Primary Examiner* — Sung Pak
(74) *Attorney, Agent, or Firm* — Additon, Higgins & Pendleton, P.A.

(57) ABSTRACT

A depressed graded-index multimode optical fiber includes a central core, an inner depressed cladding, a depressed trench, an outer depressed cladding, and an outer cladding. The central core has an alpha-index profile. The depressed claddings limit the impact of leaky modes on optical-fiber performance characteristics (e.g., bandwidth, core size, and/or numerical aperture).

22 Claims, 3 Drawing Sheets

(56) References Cited

U.S. PATENT DOCUMENTS

| | | |
|---|---|---|
| 5,115,486 A | 5/1992 | Bader et al. |
| 5,142,603 A | 8/1992 | Forrester |
| 5,194,714 A | 3/1993 | Le Sergent |
| 5,278,687 A | 1/1994 | Jannson et al. |
| 5,381,503 A | 1/1995 | Kanamori et al. |
| 5,522,007 A * | 5/1996 | Drouart et al. ............... 385/141 |
| 5,574,816 A | 11/1996 | Yang et al. |
| 5,702,497 A | 12/1997 | Oh et al. |
| 5,717,805 A | 2/1998 | Stulpin |
| 5,761,362 A | 6/1998 | Yang et al. |
| 5,841,933 A | 11/1998 | Hoaglin et al. |
| 5,911,023 A | 6/1999 | Risch et al. |
| 5,982,968 A | 11/1999 | Stulpin |
| 6,002,818 A | 12/1999 | Fatehi et al. |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,185,346 B1 | 2/2001 | Asawa et al. |
| 6,202,447 B1 | 3/2001 | Drouart et al. |
| 6,210,802 B1 | 4/2001 | Risch et al. |
| 6,215,931 B1 | 4/2001 | Risch et al. |
| 6,269,663 B1 | 8/2001 | Drouart et al. |
| 6,292,603 B1 | 9/2001 | Mizuochi et al. |
| 6,292,612 B1 | 9/2001 | Golowich et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,470,126 B1 | 10/2002 | Mukasa |
| 6,490,398 B2 | 12/2002 | Gruner-Nielsen et al. |
| 6,493,491 B1 | 12/2002 | Shen et al. |
| 6,580,863 B2 | 6/2003 | Yegnanarayanan et al. |
| 6,603,908 B2 | 8/2003 | Dallas et al. |
| 6,606,437 B1 | 8/2003 | Mukasa et al. |
| 6,618,534 B2 | 9/2003 | Abbott, III et al. |
| 6,618,538 B2 | 9/2003 | Nechitailo et al. |
| 6,658,184 B2 | 12/2003 | Bourget et al. |
| 6,724,965 B2 | 4/2004 | Abbott et al. |
| 6,724,966 B2 | 4/2004 | Mukasa |
| 6,735,985 B2 | 5/2004 | DiGiovanni et al. |
| 6,749,446 B2 | 6/2004 | Nechitailo |
| 6,750,294 B2 | 6/2004 | Sugiyama et al. |
| 6,771,865 B2 | 8/2004 | Blaszyk et al. |
| 6,853,798 B1 | 2/2005 | Weiss |
| 6,904,218 B2 | 6/2005 | Sun et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,006,751 B2 | 2/2006 | Provost et al. |
| 7,043,126 B2 | 5/2006 | Guan et al. |
| 7,043,128 B2 | 5/2006 | DiGiovanni et al. |
| 7,045,010 B2 | 5/2006 | Sturman, Jr. |
| 7,089,765 B2 | 8/2006 | Schaper et al. |
| 7,162,128 B2 | 1/2007 | Lovie et al. |
| 7,228,032 B2 | 6/2007 | Blauvelt et al. |
| 7,315,677 B1 | 1/2008 | Li et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,400,835 B2 | 7/2008 | Sardesai et al. |
| 7,406,235 B2 | 7/2008 | Guan et al. |
| 7,421,172 B2 | 9/2008 | Matthijsse et al. |
| 7,421,174 B2 | 9/2008 | Fleming, Jr. et al. |
| 7,483,612 B2 | 1/2009 | Digiovanni et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,539,381 B2 | 5/2009 | Chen et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,574,095 B2 | 8/2009 | Lock et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,646,955 B2 | 1/2010 | Donlagic |
| 7,665,902 B2 | 2/2010 | Griffioen et al. |
| 7,702,204 B2 | 4/2010 | Gonnet et al. |
| 7,724,998 B2 | 5/2010 | Parris et al. |
| 7,783,149 B2 | 8/2010 | Fini |
| 7,787,731 B2 | 8/2010 | Bookbinder et al. |
| 7,817,257 B2 | 10/2010 | Takenaga et al. |
| 7,817,891 B2 | 10/2010 | Lavenne et al. |
| 7,826,691 B2 | 11/2010 | Matthijsse et al. |
| 7,865,050 B1 | 1/2011 | Sun |
| 7,878,712 B2 | 2/2011 | Shimotakahara et al. |
| 7,889,960 B2 | 2/2011 | de Montmorillon et al. |
| 7,903,917 B2 | 3/2011 | Bickham et al. |
| 7,903,918 B1 | 3/2011 | Bickham et al. |
| 7,970,247 B2 | 6/2011 | Barker |
| 7,974,507 B2 | 7/2011 | Lovie et al. |
| 7,995,888 B2 | 8/2011 | Gholami et al. |
| 8,009,950 B2 | 8/2011 | Molin et al. |
| 8,031,997 B2 | 10/2011 | Overton |
| 8,041,167 B2 | 10/2011 | Overton |
| 8,041,168 B2 | 10/2011 | Overton |
| 8,041,172 B2 | 10/2011 | Sillard et al. |
| 8,055,111 B2 | 11/2011 | Sillard et al. |
| 8,081,853 B2 | 12/2011 | Overton |
| 8,145,025 B2 | 3/2012 | de Montmorillon et al. |
| 8,145,026 B2 | 3/2012 | Overton et al. |
| 8,145,027 B2 | 3/2012 | Overton et al. |
| 8,165,439 B2 | 4/2012 | Overton |
| 8,184,936 B2 | 5/2012 | Zhang et al. |
| 8,195,018 B2 | 6/2012 | Overton et al. |
| 8,428,411 B2 | 4/2013 | de Montmorillon et al. |
| 2002/0102082 A1 | 8/2002 | Sarchi et al. |
| 2002/0176678 A1 | 11/2002 | Mukasa |
| 2002/0197038 A1 | 12/2002 | Abbott et al. |
| 2003/0024276 A1 | 2/2003 | Anderson et al. |
| 2004/0146260 A1 | 7/2004 | Kalish et al. |
| 2004/0247269 A1 | 12/2004 | Hirano et al. |
| 2005/0008312 A1 | 1/2005 | Jang et al. |
| 2006/0039665 A1 | 2/2006 | Matsuo et al. |
| 2007/0172182 A1 | 7/2007 | Lee et al. |
| 2008/0166094 A1 | 7/2008 | Bookbinder et al. |
| 2008/0292262 A1 | 11/2008 | Overton et al. |
| 2009/0059353 A1 | 3/2009 | Fini |
| 2009/0060437 A1 | 3/2009 | Fini et al. |
| 2009/0092365 A1 | 4/2009 | Donlagic |
| 2009/0154888 A1 | 6/2009 | Abbott, III et al. |
| 2009/0169163 A1 | 7/2009 | Abbott, III et al. |
| 2009/0175583 A1 | 7/2009 | Overton |
| 2009/0214167 A1 | 8/2009 | Lookadoo et al. |
| 2009/0279833 A1 | 11/2009 | Overton et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0040336 A1 | 2/2010 | Chen et al. |
| 2010/0067858 A1 | 3/2010 | Kim et al. |
| 2010/0092135 A1 | 4/2010 | Barker et al. |
| 2010/0118388 A1 | 5/2010 | Pastouret et al. |
| 2010/0119202 A1 | 5/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |

(56) References Cited

U.S. PATENT DOCUMENTS

| | | |
|---|---|---|
| 2010/0220966 A1 | 9/2010 | Bennett |
| 2010/0254653 A1 | 10/2010 | Molin et al. |
| 2010/0310218 A1 | 12/2010 | Molin et al. |
| 2011/0002590 A1 | 1/2011 | Ooizumi et al. |
| 2011/0026889 A1 | 2/2011 | Risch et al. |
| 2011/0037183 A1 | 2/2011 | Tudury et al. |
| 2011/0044594 A1 | 2/2011 | Tudury et al. |
| 2011/0044596 A1 | 2/2011 | Zhang et al. |
| 2011/0054861 A1 | 3/2011 | Lane |
| 2011/0054862 A1 | 3/2011 | Pimpinella et al. |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0085770 A1* | 4/2011 | Bigot-Astruc et al. ....... 385/123 |
| 2011/0091171 A1 | 4/2011 | Tatat et al. |
| 2011/0116160 A1 | 5/2011 | Boivin et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0217012 A1 | 9/2011 | Bigot-Astruc et al. |
| 2011/0229101 A1 | 9/2011 | de Montmorillon et al. |
| 2011/0268398 A1 | 11/2011 | Quinn et al. |
| 2011/0268400 A1 | 11/2011 | Lovie et al. |
| 2011/0287195 A1 | 11/2011 | Molin |
| 2011/0305423 A1 | 12/2011 | Molin et al. |
| 2012/0009358 A1 | 1/2012 | Gharbi et al. |
| 2012/0014652 A1 | 1/2012 | Parris |
| 2012/0040105 A1 | 2/2012 | Overton |
| 2012/0040184 A1 | 2/2012 | de Montmorillon et al. |
| 2012/0051703 A1* | 3/2012 | Bigot-Astruc et al. ....... 385/124 |
| 2012/0057833 A1 | 3/2012 | Tatat |
| 2012/0092651 A1 | 4/2012 | Molin et al. |
| 2012/0134376 A1 | 5/2012 | Burov et al. |
| 2012/0148206 A1 | 6/2012 | Boivin et al. |
| 2012/0195549 A1 | 8/2012 | Molin et al. |
| 2012/0195561 A1 | 8/2012 | Molin et al. |
| 2012/0213483 A1 | 8/2012 | Risch et al. |
| 2012/0224254 A1 | 9/2012 | Burov et al. |
| 2012/0243843 A1 | 9/2012 | Molin et al. |
| 2012/0251062 A1* | 10/2012 | Molin et al. ................. 385/124 |
| 2012/0275751 A1 | 11/2012 | Krabshuis et al. |
| 2012/0301093 A1 | 11/2012 | Sillard et al. |
| 2012/0315006 A1 | 12/2012 | Bigot-Astruc et al. |
| 2013/0004135 A1* | 1/2013 | Bigot-Astruc et al. ....... 385/126 |
| 2013/0028564 A1 | 1/2013 | Molin et al. |
| 2013/0071114 A1 | 3/2013 | Bickham et al. |

FOREIGN PATENT DOCUMENTS

| | | |
|---|---|---|
| EP | 2220524 A1 | 8/2010 |
| EP | 2312350 A1 | 4/2011 |
| EP | 2541292 A1 | 2/2013 |
| JP | 06-216440 A | 8/1994 |
| JP | 08-304636 A | 11/1996 |
| JP | 09-048629 | 2/1997 |
| JP | 11-064665 A | 3/1999 |
| JP | 2000-347057 A2 | 12/2000 |
| JP | 2001-235648 | 8/2001 |
| JP | 2002-318315 A | 10/2002 |
| JP | 2006-047719 A | 2/2006 |
| JP | 2006-078543 A | 3/2006 |
| JP | 2006-227173 A | 8/2006 |
| JP | 2007-272239 | 10/2007 |
| WO | 00/50941 A1 | 8/2000 |
| WO | 03/081301 A1 | 10/2003 |
| WO | 2005/106544 A1 | 11/2005 |
| WO | 2008/085851 A1 | 7/2008 |
| WO | 2009/062131 A1 | 5/2009 |
| WO | 2009/078962 A1 | 6/2009 |
| WO | 2010/036684 A2 | 4/2010 |
| WO | 2011/040830 A1 | 4/2011 |
| WO | 2011/109263 A1 | 9/2011 |

OTHER PUBLICATIONS

Gloge et al., "Multimode Theory of Graded-Core Fibers", Bell system Technical Journal 1973, pp. 1563-1578.

Yabre, "Comprehensive Theory of Dispersion in Graded Index Optical Fibers", Journal of Lightwave Technology, Feb. 2000, vol. 18, No. 2, pp. 166-177.

Sasaki, P.L. Francois, D.N. Payne, "Accuracy and resolution of preform index-profiling by the spatial-filtering method," ECOC'81, 6.4-1, Copenhagen, Denmark.

Kashima et al., "Transmission characteristics of graded-index optical fibers with a lossy outer layer," Applied Optics USA, vol. 17, No. 8, Apr. 15, 1978.

Jacomme, "Modal dispersion in multimode graded-index fibers," Applied Optics USA, vol. 14, No. 11, Nov. 1, 1975, pp. 2578-2584.

Okamoto et al., "Computer-Aided Synthesis of the Optimum Refractive-Index Profile for a Multimode Fiber," IEEE Transaction on Microwave Theory and Techniques, USA, vol. MTT-25, No. 3, Mar. 1977, pp. 1-10.

Donalagic, "Opportunities to Enhance Multimode Fiber Links by Application of Overfilled Launch," Journal of Lightwave Technology, vol. 23, No. 11, (Nov. 2005) pp. 3526-3540.

Morikuni et al., "Simulation-Based Prediction of Multimode Fiber Bandwidth for 10 Gb/s Systems," LEOS 2002, 15th Annual Meeting of IEEE Lasers & Electro-Optics Society, Glasgow, Scotland, pp. 1-2.

Guan et al., "Multimode Fibers for Compensating Intermodal Dispersion of Graded-Index Multimode Fibers", Jul. 2004, Journal of Lightwave Technology, vol. 22, No. 7, pp. 1714-1719.

Freund, et al., "High-Speed Transmission in Multimode Fibers", Journal of Lightwave Technology, vol. 28, No. 4, Feb. 15, 2010, pp. 1-18.

Kaminow et al., "Profile synthesis in multicomponent glass optical fibers", Applied Optics, vol. 16, No. 1, Jan. 1, 1977, pp. 108-112.

Molin et al., "Low Bending Sensitivity of Regular OM3/OM4 Fibers in 10GbE Applications", Optical Fiber Communication (OFC) Collocated National Fiber Optic Engineers Conference, 2010 Conference on (OFC/NFOEC), IEEE, Piscataway, NJ, Mar. 21, 2010, pp. 1-3.

Pepeljugoski et al., "15.6-Gb/s Transmission Over 1 km of Next Generation Multimode Fiber", IEEE Photonics Technology Letters, vol. 14, No. 5, May 2002, pp. 1-3.

* cited by examiner

MULTIMODE OPTICAL FIBER

CROSS-REFERENCE TO PRIORITY APPLICATIONS

This application further claims the benefit of commonly assigned U.S. Provisional Patent Application Ser. No. 61/503,773 for a "Multimode Optical Fibre" (filed Jul. 1, 2011), which is hereby incorporated by reference in its entirety.

STATEMENT REGARDING FEDERALLY SPONSORED RESEARCH OR DEVELOPMENT

This invention was made with U.S. Government support under Contract No. DE-EE0002786 awarded by the U.S. Department of Energy. The U.S. Government has certain rights in this invention.

This application hereby claims the benefit of pending European Application No. 11305851.5 for a "Multimode Optical Fibre" (filed Jul. 1, 2011, at the European Patent Office), which is hereby incorporated by reference in its entirety.

FIELD OF THE INVENTION

The present invention relates to the field of fiber optic transmission and, more specifically, to a trench-assisted, depressed graded-index multimode optical fiber.

BACKGROUND

An optical fiber (i.e., a glass fiber typically surrounded by one or more coating layers) conventionally includes an optical fiber core, which transmits and/or amplifies an optical signal, and an optical cladding, which confines the optical signal within the core. Accordingly, the refractive index of the core n, is typically greater than the refractive index of the optical cladding $n_g$ (i.e., $n_c > n_g$).

For optical fibers, the refractive index profile is generally classified according to the graphical appearance of the function that associates the refractive index with the radius of the optical fiber. Conventionally, the distance r to the center of the optical fiber is shown on the x-axis, and the difference between the refractive index (at radius r) and the refractive index of the optical fiber's outer cladding (e.g., an outer optical cladding) is shown on the y-axis. The refractive index profile is referred to as a "step" profile, a "trapezoidal" profile, a "parabolic" profile, or a "triangular" profile for graphs having the respective shapes of a step, a trapezoid, a parabola, or a triangle. These curves are generally representative of the optical fiber's theoretical or set profile. Constraints in the manufacture of the optical fiber, however, may result in a slightly different actual profile.

Generally speaking, two main categories of optical fibers exist: multimode fibers and single-mode fibers. In a multimode optical fiber, for a given wavelength, several optical modes are propagated simultaneously along the optical fiber. In a single-mode optical fiber, the signal propagates in a fundamental LP01 mode that is guided in the optical-fiber core, while the higher order modes (e.g., the LP11 mode) are strongly attenuated. The typical diameter of a single-mode or multimode glass fiber is 125 microns. The core of a multimode optical fiber typically has a diameter of between about 50 microns and 62.5 microns, whereas the core of a single-mode optical fiber typically has a diameter of between about 6 microns and 9 microns. Multimode systems are generally less expensive than single-mode systems, because multimode light sources, connectors, and maintenance can be obtained at a lower cost.

For the same propagation medium (i.e., in a step-index multimode optical fiber), the different modes have different group delay times. This difference in group delay times results in a time lag (i.e., a delay) between the pulses propagating along different radial offsets of the optical fiber. This delay causes a broadening of the resulting light pulse. Broadening of the light pulse increases the risk of the pulse being superimposed onto a trailing pulse, which reduces the bandwidth (i.e., data rate) supported by the optical fiber. The bandwidth, therefore, is linked to the group delay time of the optical modes propagating in the multimode core of the optical fiber. Thus, to guarantee a broad bandwidth, it is desirable for the group delay times of all the modes to be identical. Stated differently, the intermodal dispersion should be zero, or at least minimized, for a given wavelength.

To reduce intermodal dispersion, the multimode optical fibers used in telecommunications generally have a core with a refractive index that decreases progressively from the center of the optical fiber to its interface with a cladding (i.e., an "alpha" core profile). Such an optical fiber has been used for a number of years, and its characteristics have been described in "*Multimode Theory of Graded-Core Fibers*" by D. Gloge et al., Bell system Technical Journal 1973, pp. 1563-1578, and summarized in "*Comprehensive Theory of Dispersion in Graded-Index Optical Fibers*" by G. Yabre, Journal of Lightwave Technology, February 2000, Vol. 18, No. 2, pp. 166-177. Each of the above-referenced articles is hereby incorporated by reference in its entirety.

A graded-index profile (i.e., an alpha-index profile) can be described by a relationship between the refractive index value n and the distance r from the center of the optical fiber according to the following equation:

$$n = n_{max}\sqrt{1 - 2\Delta\left(\frac{r}{r_1}\right)^\alpha}$$

wherein, $\alpha \geq 1$, and $\alpha$ is a non-dimensional parameter that is indicative of the shape of the index profile;

$n_{max}$ is the maximum refractive index of the optical fiber's core;

$r_1$ is the radius of the optical fiber's core; and $$\Delta = \frac{(n_{max}^2 - n_{min}^2)}{2n_{max}^2}$$

where $n_{min}$ is the minimum refractive index of the multimode core, which may correspond to the refractive index of the outer cladding (most often made of silica).

A multimode optical fiber with a graded index (i.e., an alpha profile) therefore has a core profile with a rotational symmetry such that along any radial direction of the optical fiber the value of the refractive index decreases continuously from the center of the optical fiber's core to its periphery. When a multimode light signal propagates in such a graded-index core, the different optical modes experience differing propagation mediums (i.e., because of the varying refractive indices). This, in turn, affects the propagation speed of each optical mode differently. Thus, by adjusting the value of the parameter $\alpha$, it is possible to obtain a group delay time that is nearly equal for all of the modes. Stated differently, the refractive index profile can be modified to reduce or even eliminate intermodal dispersion. Furthermore, the value of the parameter α may be adjusted to provide a high bandwidth at a given wavelength or over a range of wavelengths (e.g., between about 850 nanometers and 1300 nanometers).

Multimode optical fibers have been the subject of international standardization under the ITU-T G.651.1 recommendations, which, in particular, define criteria (e.g., bandwidth, numerical aperture, and core diameter) that relate to the requirements for optical fiber compatibility. The ITU-T G.651.1 standard (July 2007) is hereby incorporated by reference in its entirety.

In addition, the OM3 standard has been adopted to meet the demands of high-bandwidth applications (i.e., a data rate higher than 1 GbE) over long distances (i.e., distances greater than 300 meters). The OM3 standard is hereby incorporated by reference in its entirety. With the development of high-bandwidth applications, the average core diameter for multimode optical fibers has been reduced from 62.5 microns to 50 microns. Multimode optical fibers are commonly used for short-distance applications requiring a broad bandwidth, such as local networks or LAN (local area network).

Commonly owned European Publication No. 2,312,350 (and its counterpart U.S. Patent Publication No. 2011/0085770), each of which is hereby incorporated by reference in its entirety, proposes to add a trench in the inner depressed cladding to reduce leakage losses and to bring the outer cladding closer to the core. This application, however, concerns single-mode optical fibers, which present different design-problems. For example, only LP01, LP11 and LP02 modes need to be managed without constraints on bandwidth, core size, and numerical aperture. Furthermore, the ratio of the "depressed cladding's outer radius" to the "central core's outer radius" is much larger than in a multimode refractive index profile.

International Publication No. 2008/085851 (and its counterpart U.S. Patent Publication No. 2008/0166094), each of which is hereby incorporated by reference in its entirety, describe multimode optical fibers having a graded-index central core surrounded by a depressed-index annular portion between the central core and the optical cladding. This depressed-index annular portion is added to reduce the bending losses of a graded-index multimode optical fiber. Generally-speaking, the solutions disclosed in International Publication No. 2008/085851 and U.S. Patent Publication No. 2008/0166094 do not concern depressed graded-index multimode optical fibers. Applying the proposed solutions to fluorine-only-doped profiles does not permit the reduction of leakage losses when the cladding is composed of a depressed cladding and an outer cladding made of natural silica.

European Publication No. 2,166,386 (and its counterpart U.S. Patent Publication No. 2010/0067858), each of which is hereby incorporated by reference in its entirety, describe multimode optical fibers having a graded-index central core, an inner cladding adjacent to the graded-index central core, and a surrounding depressed-index annular portion between the central core and the optical cladding. This depressed-index annular portion is added to reduce the bending losses of a graded-index multimode optical fiber. Generally-speaking, the embodiments disclosed in European Publication No. 2,166,386 and U.S. Patent Publication No. 2010/0067858 A1 do not concern depressed graded-index multimode optical fibers. Applying the proposed embodiments to fluorine-only-doped profiles does not permit the reduction of leakage losses when the cladding is composed of a depressed cladding and an outer cladding made of natural silica.

European Publication No. 2,220,524, which is hereby incorporated by reference in its entirety, describes multimode optical fibers having a graded-index central core, an inner cladding adjacent to the graded-index central core, and a surrounding depressed-index annular portion between the central core and the optical cladding. This depressed-index annular portion is added to reduce the bending losses of a graded-index multimode fiber. Generally-speaking, the optical fibers disclosed in European Publication No. 2,220,524, do not concern depressed graded-index multimode optical fibers. Applying the proposed embodiments to fluorine-only-doped profiles does not permit the reduction of leakage losses when the cladding is composed of a depressed cladding and an outer cladding made of natural silica.

Moreover, the inclusion of a depressed trench results in the appearance of additional leaky modes that will co-propagate with the desired leaky modes. These additional leaky modes have effective refractive indices that are lower than those sustained by the depressed graded-index central core. As compared with the numerical aperture measured in the graded-index fibers without a depressed trench according to the well-known, standardized IEC 60793-1-43 method, the lower effective refractive indices corresponding to these additional leaky modes lead to an increase in the numerical aperture measured on two meters by the far-field pattern in the graded-index optical fibers including a depressed trench. Numerical aperture of a graded-index multimode optical fiber (GIMMF) with a depressed trench can appear larger than would be expected based on the value of the parameter $\Delta$ of its graded-index core.

In addition, the leaky modes can contribute to the distortion of core size as measured under overfilled launch (OFL) from the near-field pattern at the output of a two-meter sample using the IEC 60793-1-20 Method C. Thus, the core size of a GIMMF with a depressed trench can appear larger than would be expected based on the value of its graded-index central core's width.

Distorted numerical aperture and core size measurements may lead to incorrect conclusions regarding the core size and the refractive index profile's value of the parameter $\Delta$, which are important for connectivity. Core size and $\Delta$ determine the number and shape of the guided modes. Such a difference in the number and shape of the guided modes between two different graded-index optical fibers can lead to mode mismatching and therefore to high splice losses or connectivity losses.

In addition, multimode fibers that include (i) central cores having indices close to that of silica and (ii) down-doped index claddings provide several advantageous features compared with standard multimode fibers with up-doped central cores and silica claddings. For example, such optical fibers may exhibit improved radiation-resistance and hydrogen-resistance, as well as low losses and large bandwidths. These structures, however, are difficult and expensive to make because a highly depressed cladding is deposited. The deposited cladding's refractive index difference with respect to silica may reach $-16 \times 10^{-3}$. Thus, the PCVD technique is often used. This technique is an inside deposition process (like the methods MCVD and FCVD) that facilitates the achievement of such low, negative refractive index differences. That said, the silica substrate tube used in the PCVD technique must be positioned far from the central core to prevent the modes from leaking and thus experiencing high leakage losses. The constraints imposed by the positioning of the substrate tube typically yield small-diameter core rods, thereby increasing manufacturing costs.

Thus, there exists a need for a multimode optical fiber that includes a depressed cladding that limits the impact of the leaky modes on other optical-fiber characteristics (e.g., bandwidth, core size, and/or numerical aperture) but that may be deposited within a silica substrate tube at a reduced width.

SUMMARY

Accordingly, in one aspect, the present invention embraces a multimode optical fiber that includes a central core surrounded by an outer cladding (e.g., an outer optical cladding or external cladding). The central core has an outer radius R1 and an alpha-index profile (i.e., a graded-index profile). The central core's alpha-index profile has a maximum refractive index value (e.g., at the center of the central core), which corresponds to a maximum refractive index difference $\Delta n1$ with respect to the outer cladding.

The multimode optical fiber also includes an inner depressed cladding positioned between the central core and the outer cladding (e.g., immediately surrounding the central core). The inner depressed cladding has an outer radius R2, a width w1, and a refractive index difference $\Delta n_{inner}$ with respect to the outer cladding. In exemplary embodiments, the central core and inner depressed cladding are referred to collectively as a "core region." The inner depressed cladding's width w1 is typically between about 0.6 micron and 3.5 microns.

The multimode optical fiber typically includes (i) a depressed trench positioned between the inner depressed cladding and the outer cladding (e.g., immediately surrounding the inner depressed cladding) and (ii) an outer depressed cladding positioned between the depressed trench and the outer cladding (e.g., immediately surrounding the depressed trench).

The depressed trench has an outer radius R3, a width w2, a volume $V_{trench}$, and a refractive index difference $\Delta n_{trench}$ with respect to the outer depressed cladding. Typically, the depressed trench's volume $V_{trench}$ is between about $1650 \times 10^{-3}$ $\mu m^2$ and $4500 \times 10^{-3}$ $\mu m^2$.

The outer depressed cladding has an outer radius R4 and a refractive index difference $\Delta n2$ with respect to the outer cladding. The outer depressed cladding's outer radius R4 is typically between about 30 microns and 47 microns.

In an exemplary embodiment, the central core's maximum refractive index difference $\Delta n1$ is between about $-1.0 \times 10^{-3}$ and $0.8 \times 10^{-3}$.

In another exemplary embodiment, the outer depressed cladding's refractive index difference $\Delta n2$ is between about $-18 \times 10^{-3}$ and $-12 \times 10^{-3}$.

In yet another exemplary embodiment, the depressed trench's width w2 is between about 2.4 microns and 10 microns.

In yet another exemplary embodiment, at a wavelength of 850 nanometers, the measured overfilled launch bandwidth for a 500-meter sample of the optical fiber is about 90 percent or more of the measured overfilled launch bandwidth for an 8-kilometer sample of the optical fiber (i.e., a decrease in overfilled launch bandwidth of about 10 percent or less).

In yet another exemplary embodiment, at a wavelength of 1300 nanometers, the measured overfilled launch bandwidth for a 500-meter sample of the optical fiber is about 70 percent or more of the measured overfilled launch bandwidth for an 8-kilometer sample of the optical fiber (i.e., a decrease in overfilled launch bandwidth of about 30 percent or less).

In yet another exemplary embodiment, at a wavelength of 850 nanometers using the near-field technique, the measured optical core size for a two-meter sample of the optical fiber is equal to the central core's outer radius R1 with a tolerance of ±2 microns.

In yet another exemplary embodiment, the central core's outer radius R1 is between about 23 microns and 27 microns.

In yet another exemplary embodiment, the depressed trench's refractive index difference $\Delta n_{trench}$ with respect to the outer depressed cladding is between about $-6 \times 10^{-3}$ and $-2 \times 10^{-3}$.

In yet another exemplary embodiment, the depressed trench has a refractive index difference with respect to the outer cladding of between about $-24 \times 10^{-3}$ and $-14 \times 10^{-3}$.

In yet another exemplary embodiment, the inner depressed cladding has a refractive index difference with respect to the outer depressed cladding of between about $-2 \times 10^{-3}$ and $2 \times 10^{-3}$.

In yet another exemplary embodiment, the central core's alpha-profile has an alpha parameter of between about 1.9 and 2.1.

In yet another exemplary embodiment, at a wavelength of 850 nanometers, the optical fiber has an overfilled launch (OFL) bandwidth of about 500 MHz·km or greater (e.g., about 1000 MHz·km or greater).

In yet another exemplary embodiment, at a wavelength of 1300 nanometers, the optical fiber has an overfilled launch (OFL) bandwidth of about 500 MHz·km or greater (e.g., about 1000 MHz·km or greater).

In another aspect, the present invention embraces a method for manufacturing an optical fiber in accordance with the foregoing.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
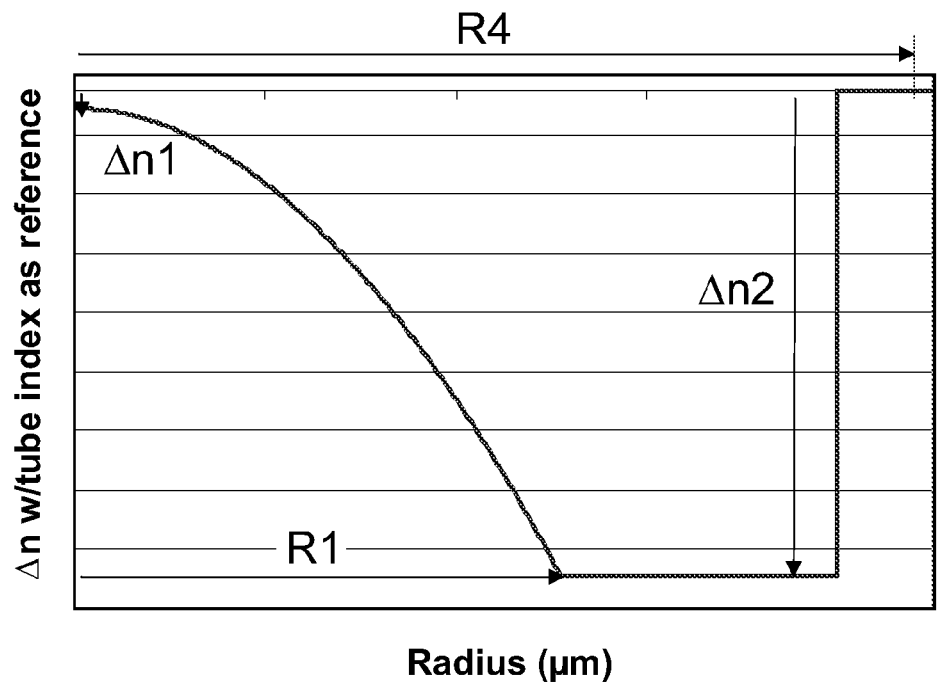
FIG. 1 graphically depicts the set refractive index profile of a comparative depressed graded-index multimode optical fiber.

The present invention embraces a depressed graded-index multimode optical fiber that includes a depressed cladding that limits the impact of the leaky modes on other optical-fiber characteristics (e.g., bandwidth, core size, and/or numerical aperture).

There has been increasing interest in using optical fibers in nuclear power plants and other radiation-rich environments, such as particle acceleration laboratories and satellites. For example, optical fibers may be used in optical data communication links, distributed sensors, plasma diagnostics, and instrumentation systems. In such applications, optical fibers typically transmit signals through noisy electromagnetic environments, high gamma ray dosages and/or dosage rates, and high neutron fluences.

Signals transmitted via optical fibers typically undergo optical losses (i.e., attenuation) that accumulate over the distance traveled. These transmission losses increase substantially when the optical fiber is subjected to ionizing radiation, such as beta, alpha, gamma, and/or X-rays.

When exposed to such radiation, the presence of germanium and/or phosphorous tends to promote the formation of defects in the optical fiber, which increases radiation-induced attenuation. Accordingly, phosphorous-free and germanium-free optical fibers have been proposed for applications in radiation-rich environments.

There has also been increasing interest in using optical fibers for distributed temperature sensing in geothermal wells. Temperature profiles obtained just after drilling can provide information regarding efficient ways to harness heat generated by the well. Additionally, long-term thermal monitoring of a power-producing geothermal well is needed to optimize its production. For practical use, however, the optical fiber placed in the geothermal well must be capable of surviving a harsh, hydrogen-containing downhole environment for long periods (e.g., several years). Transmission anomalies have been found to be related to the formation of OH$^-$ ions in the silicate glass matrix of the optical fibers. The likely degradation mechanism is that hydrogen in the hot downhole environment diffuses into the optical fiber and reacts with the oxygen of the silicate glass to form OH$^-$ ions. The presence of germanium and/or phosphorus in the silicate glass matrix promotes the formation of OH$^-$ ions. Accordingly, phosphorous-free and low germanium-content optical fibers combined with barrier coatings have been proposed for applications in downhole environments.

Phosphorous-free and germanium-free multimode optical fibers conventionally have a graded-index alpha-profile central core and a cladding of flourine-doped silica to reduce its refractive index. The graded-index central core and cladding are therefore depressed compared with pure silica's refractive index.

Optical fibers may be manufactured by drawing from final optical preforms (e.g., on a fiber-drawing tower). An exemplary optical preform may include a primary optical preform that includes a very high quality glass tube that makes up a portion of the cladding and the central core of the optical fiber. This primary optical preform is then overcladded or sleeved to increase its diameter and to form a final optical preform, which may be used on a fiber-drawing tower.

The fiber-drawing operation includes placing the final optical preform vertically in a tower and drawing an optical-fiber strand from the end of the final optical preform. For this, a high temperature is locally applied at one end of the final optical preform until the silica is softened. The fiber-drawing rate and the temperature are then continuously monitored during the optical-fiber drawing to control the optical fiber's diameter. The geometry of the final optical preform should conform to the optical fiber's refractive-index ratios and the dimensional ratios (e.g., with respect to the core and cladding) so that the drawn optical fiber has the required profile.

The primary optical preform may include a substrate tube (e.g., in quartz) in which one or more layers of doped and/or undoped silica have been deposited to form the central core and an inner cladding of the optical fiber. Deposition techniques inside a substrate tube include Modified Chemical Vapor Deposition (MCVD), Furnace Chemical Vapor Deposition (FCVD), or Plasma Chemical Vapor Deposition (PCVD). After depositing the layers corresponding to the core and the inner cladding, the tube may be closed onto itself during an operation called collapsing.

Component deposition is commonly referred to by the expression "doping," by which dopants are added to the silica to change its refractive index. Germanium (Ge) and phosphorus (P) increase the refractive index of silica, and each is often used for doping the optical fiber's central core. Fluorine (F) and boron (B) lower the refractive index of silica, and fluorine is often used for forming depressed claddings.

Manufacturing primary preforms that include large, highly depressed graded-index central cores and claddings presents unique problems. Such primary preforms require fluorine in both the central-core region and in the surrounding cladding. Beyond a certain temperature, fluorine incorporates poorly into heated silica, but high temperatures are required for making glass. The PCVD technique can be efficiently used to produce depressed claddings inside a deposition tube. Such a manufacturing technique is described, for example, in U.S. Pat. No. Re. 30,635 and U.S. Pat. No. 4,314,833, each of which is hereby incorporated by reference in its entirety.

The PCVD technique allows significant amounts of fluorine to be incorporated into silica, thereby forming highly depressed claddings. A deposition tube, made of either pure silica or fluorine-doped silica, is provided and mounted in a glasswork tower. The deposition tube is then rotated and a gas mixture of silica and dopants are injected into the tube. The deposition tube crosses a microwave cavity in which the gas mixture is heated locally. The microwave heating generates plasma by ionizing the injected gases. The ionized dopants react with the silica particles to deposit doped silica layers inside the tube. The microwave heating significantly increases the reactivity of the dopants thereby enabling a high concentration of dopants to be incorporated into the silica layers.

FIG. 1 graphically depicts the refractive index profile of a conventional depressed graded-index multimode optical fiber (DGIMMF). The optical fiber includes a central core surrounded by an outer cladding (e.g., an outer optical cladding). For reasons of cost, the outer cladding is typically made of natural silica, but it may also be made of doped silica. As shown, the optical fiber's central core is a glass-based central core having an alpha index profile (i.e., a graded-index profile) and an outer radius R1. The central core is typically doped with fluorine (F) to reduce the refractive index of the silica. Typically, the graded-index core and the inner cladding are made by deposition inside a substrate tube, and the outer cladding is formed from (i) the substrate tube used for making the primary preform and (ii) the overclad or sleeve used to reach the desired dimensional ratios.

In the above-described optical fiber having an outer cladding with substantially the same refractive index as the maximum of the graded-index core (i.e., alpha-index profile core), the different modes transmitted by the multimode optical fiber are not completely guided and show additional losses, called leakage losses. Leakage losses are due to partial reflection of the modes experiencing effective refractive indices (i.e., their real part) lower than that of the outer cladding at the inner interface of the outer cladding. For a given mode, lower effective refractive indices generate higher leakage losses. Consequently, leakage losses will be higher for the highest order modes. To minimize these leakage losses, the fraction of energy propagating in the pure silica outer cladding must be reduced. The inner depressed cladding silica must be sufficiently extended to ensure good confinement of the optical signal in the graded-index central core and an acceptable level of leakage losses.

High leakage losses are detrimental, because they lead to dramatic reductions in effective core size and numerical aperture. This can be critical for backward compatibility with standard multimode optical fibers and for connectorization purposes.

In addition, the highest attenuation of the highest order modes will lead to suppression of the modes having the largest group-time-delay differences. As a consequence, the optical fiber's bandwidth will suffer from significant optical-fiber-length dependence, which can be problematic for fiber characterization purpose.

MCVD, FCVD, and PCVD techniques are satisfactory to obtain good quality central cores and highly depressed large inner claddings, but these techniques may be costly when large capacity preforms are sought. The use of CVD techniques, however, makes it possible to limit attenuation and, in particular, the attenuation at 1383 nanometers attributed to the OH⁻ peak.

The capacity of an optical preform is defined as the quantity of optical fiber (i.e., length of optical fiber) that can be drawn from the preform. Larger diameter preforms typically have greater capacities. To reduce manufacturing costs, it is desirable to draw long lengths of optical fiber from one optical preform. It is therefore sought to fabricate large-diameter preforms while complying with the above-mentioned constraints regarding the diameters of the central core and the depressed inner cladding. Therefore, a smaller ratio of the "depressed cladding's outer radius" to the "graded-index central core's outer radius" facilitates the manufacture of a larger diameter preform, thereby lowering its manufacturing cost.

Furthermore, reducing the width of the depressed cladding allows relatively more deposition of the graded-index central core, which typically improves the accuracy of the alpha-shape profile. One solution to reduce the width of the depressed cladding includes adding a depressed trench in the inner cladding between the graded-index core and the outer cladding. Accordingly, exemplary embodiments of the multimode optical fiber according to the present invention typically include a depressed trench positioned between a graded-index central core and an external cladding.

Typically, wider depressed trenches reduce the leakage losses of the leaky modes. In addition, the number of leaky modes increases as the depressed trench deepens (i.e., in terms of absolute value, the bigger the negative refractive index difference of the depressed trench with respect to the outer cladding). Furthermore, the depressed trench also allows the leaky modes to co-propagate with the desired guided modes.

These leaky modes can significantly disturb both the near-field pattern and the far-field pattern observed at the output of a two-meter sample of an optical fiber and overestimate the graded-index core size.

In view of the foregoing, the depressed trench's characteristics (e.g., width, outer radius, and refractive index difference) facilitate the simultaneous achievement of: (i) reduced leakage losses for the desired guided modes (i.e., the core modes); (ii) a limited number of additional leaky modes; (iii) increased leakage losses for the leaky modes; and (iv) high bandwidths. Reducing leakage losses for the desired guided modes in the central core prevents reduction of core size and/or numerical aperture, as well as disturbances of the optical fiber's bandwidth over its length. Because the leaky modes can propagate over several meters, limiting the presence of these additional leaky modes facilitates accurate estimations of the graded-index core dimensions. Furthermore, because core dimensions are relevant for assessing an optical fiber's connectivity performance, good control of the leaky modes is important for connectivity purposes.

Figure 2:
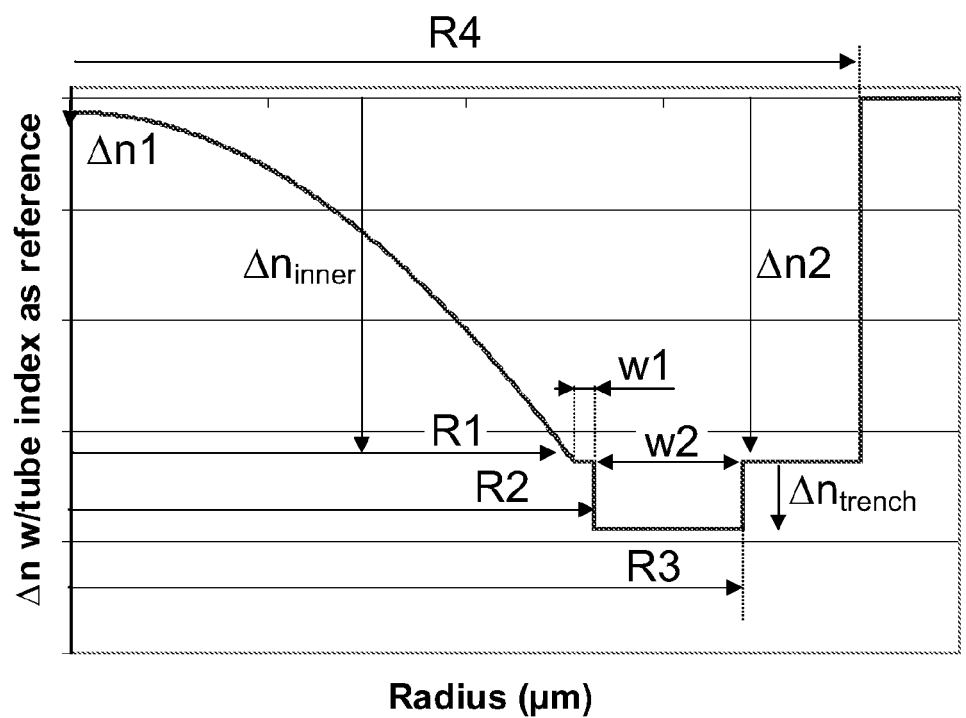
FIG. 2 graphically depicts the set refractive index profile of an exemplary optical fiber according to the present invention.

Accordingly, exemplary multimode optical fibers according to the present invention typically possess a set refractive index profile that includes a depressed graded-index central core (e.g., an alpha-index core) and a depressed trench. FIG. 2 graphically depicts the set refractive index profile of an exemplary optical fiber according to the present invention. The multimode optical fiber includes a central core surrounded by an outer cladding (e.g., an outer optical cladding or external cladding). The outer cladding is typically derived from the substrate tube in which deposition of glass layers took place during preform manufacturing. The central core has an outer radius R1 and an alpha-index profile (i.e., a graded-index profile) with respect to the inner depressed cladding. The central core's alpha-index profile has a maximum refractive index value (e.g., at the center of the central core) that corresponds to a maximum refractive index difference $\Delta n_1$ with respect to the outer cladding.

In exemplary embodiments, the central core's alpha-index profile has an alpha parameter of between 1.9 and 2.1 (e.g., 1.95 as depicted in FIG. 2). The central core's outer radius R1 may be that of a typical multimode optical fiber (e.g., about 36.25 microns or less). Typically, the central core's outer radius R1 is between 23 microns and 27 microns (e.g., about 25.5 microns). The central core's maximum refractive index difference $\Delta n_1$ is typically between $-1.0 \times 10^{-3}$ and $0.8 \times 10^{-3}$.

The multimode optical fiber also includes an inner depressed cladding positioned between the central core and the outer cladding (e.g., immediately surrounding the central core). The inner depressed cladding has an outer radius R2, a width w1, and a refractive index difference $\Delta n_{inner}$ with respect to the outer cladding. In exemplary embodiments, the central core and inner depressed cladding are referred to collectively as a "core region." As depicted, the inner depressed cladding's refractive index difference $\Delta n_{inner}$ is typically constant across its width w1.

In exemplary embodiments, the inner depressed cladding's width w1 is between 0.6 micron and 3.5 microns (e.g., between 0.8 microns and 2.5 microns). Such widths for the inner depressed cladding facilitate the achievement of appropriate optical core sizes without reducing the multimode optical fiber's bandwidth.

The multimode optical fiber typically includes (i) a depressed trench positioned between the inner depressed cladding and the outer cladding (e.g., immediately surrounding the inner depressed cladding) and (ii) an outer depressed cladding positioned between the depressed trench and the outer cladding (e.g., immediately surrounding the depressed trench).

The depressed trench has an outer radius R3, a width w2, a volume $V_{trench}$, and a refractive index difference $\Delta n_{trench}$ with respect to the outer depressed cladding. In exemplary embodiments, the depressed trench's width w2 is between 2.4 microns and 10 microns. Exemplary optical fibers include a depressed trench having a refractive index difference $\Delta n_{trench}$ of between $-6 \times 10^{-3}$ and $-2 \times 10^{-3}$.

As noted, the depressed trench has a volume $V_{trench}$. As used herein, the depressed trench's volume $V_{trench}$ is defined by the following equation:

$$V_{trench} = 2\pi \left| \int_{R2}^{R3} \Delta n_{trench}(r) r \, dr \right|.$$

In exemplary embodiments, the depressed trench's volume $V_{trench}$ is between $1650\times10^{-3}$ µm² and $4500\times10^{-3}$ µm² (e.g., between $3000\times10^{-3}$ µm² and $4000\times10^{-3}$ µm². Such depressed trench volumes control leakage losses such that the central core's outer radius may be smaller than a typical multimode optical fiber, which reduces manufacturing costs, while maintaining other optical fiber properties.

The outer depressed cladding has an outer radius R4 and a refractive index difference Δn2 with respect to the outer cladding. The outer depressed cladding's outer radius R4 is typically between 30 microns and 47 microns (e.g., between about 30 microns and 45 microns). In exemplary embodiments, the outer depressed cladding's refractive index difference Δn2 is between $-18\times10^{-3}$ and $-12\times10^{-3}$. As noted, exemplary optical fibers include a depressed trench having a refractive index difference $\Delta n_{trench}$ with respect to the outer depressed cladding of between $-6\times10^{-3}$ and $-2\times10^{-3}$. Thus, in some exemplary embodiments, the depressed trench's refractive index with respect to the outer cladding (i.e., $\Delta n_{trench}+\Delta n2$) is between $-24\times10^{-3}$ and $-14\times10^{-3}$.

In exemplary embodiments, the inner depressed cladding has a refractive index difference with respect to the outer depressed cladding of between about $-2\times10^{-3}$ and $2\times10^{-3}$. In other words, the refractive index difference between the inner depressed cladding and the outer depressed cladding may be between $-2\times10^{-3}$ and $2\times10^{-3}$. This relationship can further be described by the following mathematical expression: $\Delta n_{inner}=\Delta n_2\pm2\times10^{-3}$.

Furthermore, FIG. 2 depicts cladding layers (e.g., the inner depressed cladding, the depressed trench, and the outer depressed cladding), each having a constant refractive index difference with respect to the outer cladding. Exemplary optical fibers according to the invention, however, may have one or more refractive index differences that vary as a function of radial position (e.g., a trapezoidal, triangular, or alpha profile). For cladding layers having non-constant refractive indices, the respective refractive index differences refer to the largest refractive index difference between a cladding layer and its respective reference cladding (e.g., the outer cladding layer) in terms of absolute value. To the extent that the outer depressed cladding has a non-constant refractive index, the depressed-trench parameters (e.g., $\Delta n_{trench}$ and the depressed-trench volume) are calculated with respect to the innermost portion of the outer depressed cladding.

respect to the innermost portion of the outer cladding (i.e., that portion of the outer cladding that is closest to the central core and that may affect the propagation of optical signals within the optical fiber).

As compared with a depressed graded-index multimode optical fiber having the same central core dimensions and outer cladding position (i.e., the inner radius of the outer cladding is between about 30 microns and 45 microns) but no depressed trench (e.g., the multimode optical fiber of FIG. 1), the present exemplary multimode optical fibers exhibit improved optical performance characteristics. In particular, exemplary optical fibers having the refractive index profile of FIG. 2 and including a depressed-trench volume $V_{trench}$ of between $1650\times10^{-3}$ µm² and $4500\times10^{-3}$ µm², an inner-depressed-cladding width w1 of between 0.6 micron and 3.5 microns, and a depressed-trench width w2 of between 2 microns and 10 microns exhibited significantly improved optical performance. Indeed, such exemplary optical fibers exhibited reduced attenuation, as well as bandwidths, optical core sizes, and numerical apertures that are less optical-fiber-length dependent.

Furthermore, as compared with a depressed graded-index multimode optical fiber having the same central core dimensions but no depressed trench (e.g., the multimode optical fiber of FIG. 1), exemplary optical fibers that include a depressed trench may permit the outer cladding to be positioned closer to the central core (i.e., the outer cladding's inner radius is comparatively reduced) without degrading optical performance characteristics. Reducing the outer cladding's inner radius while maintaining central-core size and optical performance characteristics will facilitate a reduction in manufacturing costs.

The foregoing advantages will be further described with reference to Tables I and II (below). Table I shows simulated fiber-profile-parameters of exemplary and comparative optical fibers. Table II shows simulated performance characteristics of the same exemplary and comparative optical fibers. The exemplary and comparative optical fibers include similar graded-index central core's but different outer cladding positions and various trench characteristics. (Exemplary and comparative optical fibers that include a trench are designated in the form "Example T#.")

TABLE I

| Profiles | R4 (µm) | R1 (µm) | Δn1 ($10^{-3}$) | Δn1-Δn2 ($10^{-3}$) | $\Delta n_{trench}$ ($10^{-3}$) | w1 (µm) | w2 (µm) | Trench volume ($10^{-3}$ µm²) |
|---|---|---|---|---|---|---|---|---|
| Example 1 | 40 | 25.5 | −0.6 | 15.8 | 0 | NA | NA | 0 |
| Example T1 | 40 | 25.5 | −0.6 | 15.8 | −2 | 1 | 8.5 | 3285 |
| Example T2 | 40 | 25.5 | −0.6 | 15.8 | −3 | 1 | 7.5 | 4276 |
| Example T3 | 40 | 25.5 | −0.6 | 15.8 | −3 | 1 | 3 | 1583 |
| Example T4 | 40 | 25.5 | −0.6 | 15.8 | −4 | 0.8 | 5 | 3619 |
| Example T5 | 40 | 25.5 | −0.6 | 15.8 | −4 | 1.5 | 5 | 3707 |
| Example T6 | 40 | 25.5 | −0.6 | 15.8 | −4 | 7 | 5 | 4398 |
| Example 2 | 35 | 25.5 | −0.6 | 15.8 | 0 | NA | NA | 0 |
| Example T7 | 35 | 25.5 | −0.6 | 15.8 | −4 | 1.5 | 5 | 3707 |
| Example T8 | 35 | 25.5 | −0.6 | 15.8 | −4 | 0.5 | 5 | 3581 |
| Example T9 | 35 | 25.5 | −0.6 | 15.8 | −7 | 1.5 | 5 | 6487 |
| Example T10 | 35 | 25.5 | −0.6 | 15.8 | −7 | 5 | 4.5 | 6482 |
| Example T11 | 46.5 | 26.2 | −0.9 | 15.7 | −3.6 | 1.5 | 5.5 | 3788 |
| Example T12 | 32 | 25 | −0.6 | 15.8 | −5 | 2 | 4.0 | 3644 |
| Example 3 | 41 | 25 | −0.6 | 15.8 | 0 | NA | NA | 0 |

Those of ordinary skill in the art will recognize that the outer cladding typically has a constant refractive index. That said, if the outer cladding has a non-constant refractive index, refractive index differences are typically measured with For each optical fiber, Table I provides the outer depressed cladding's outer radius R4, the central core's outer radius R1, the central core's maximum refractive index difference Δn1, the difference Δn1−Δn2 between the central core's maximum refractive index difference Δn1 and the outer depressed cladding's refractive index difference Δn2, the depressed trench's refractive index difference $\Delta n_{trench}$ with respect to the outer depressed cladding, the inner depressed cladding's width w1, the depressed trench's width w2, and the depressed trench's volume $V_{trench}$. Each optical fiber's graded-index central core has an alpha parameter of 1.96. Additionally, for each optical fiber, the inner depressed cladding's refractive index difference $\Delta n_{inner}$ is equal to the outer depressed trench's refractive index difference Δn2. Comparative Examples 1, 2, and 3 do not include a depressed trench and therefore do not have values for certain parameters in Table I.

As noted, Table II shows simulated performance characteristics of the exemplary and comparative optical fibers of Table 1.

TABLE II

| Profiles | OFL-Bandwidth at 1 km | | ΔB | | Core size (μm) |
|---|---|---|---|---|---|
| | 850 nm (MHz·km) | 1300 nm (MHz·km) | 850 nm | 1300 nm | 850 nm, 2 m |
| Example 1 | 1850 | 1450 | 4.0% | 31.2% | 50.8 |
| Example T1 | 1900 | 1660 | 0.5% | 13.0% | 52.6 |
| Example T2 | 4170 | 1700 | 0.1% | −0.9% | 52.4 |
| Example T3 | 3250 | 1830 | 10.0% | 5.5% | 51.3 |
| Example T4 | 2225 | 640 | 0.2% | 22.5% | 51.5 |
| Example T5 | 2010 | 1990 | 0.2% | 9.3% | 52.7 |
| Example T6 | 1120 | 1035 | 0.9% | 5.1% | 62.2 |
| Example 2 | 1970 | 2110 | 11.3% | 39.6% | 49.7 |
| Example T7 | 2015 | 2140 | 2.9% | 3.7% | 52.7 |
| Example T8 | 1690 | 590 | 1.2% | 40.9% | 51.6 |
| Example T9 | 3250 | 875 | 2.0% | 24.6% | 53.2 |
| Example T10 | 1225 | 1220 | 0.4% | 4.3% | 59.9 |
| Example T11 | 3341 | 1600 | 0.2% | 0.4% | 53.7 |
| Example T12 | 3096 | 1834 | 6.0% | 6.9% | 49.6 |
| Example 3 | 2025 | 1148 | 1.2% | 11.1% | 49.9 |

In Table II, overfilled launch bandwidth values are measured at 1 kilometer and given for two wavelengths, 850 nanometers and 1300 nanometers. Overfilled launch bandwidth is obtained using a standardized optical-fiber bandwidth measurement method defined by the FOTP-204 standard, which is hereby incorporated by reference in its entirety. In this method, the source launches light uniformly into all modes of the multimode optical fiber. Because all of the modes are uniformly launched, this measurement method is particularly effective for detecting leakage losses. The overfilled-launch-bandwidth measurement method is especially effective for detecting leakage losses for the highest order modes, which correspond to the lowest effective refractive indices and therefore the highest leakage losses when overfilled launch bandwidth is measured over different optical-fiber lengths. To improve the reproducibility of bandwidth measurements, the overfilled-launch modes are filtered with a large-core step-index optical fiber having a core-diameter of at least 55 microns and a numerical aperture of 0.210±0.01. The large-core step-index optical fiber is 2 meters±0.2 meter in length and coupled to the optical fiber being tested.

The overfilled launch bandwidth measured over 500 meters (i.e., OFL-$BW_{0.5km}$) may be compared with the overfilled launch bandwidth measured over 8 kilometers (i.e., OFL-$BW_{8km}$). The difference between the two measured bandwidths is expressed in relative percentage and corresponds to the loss in bandwidth between the bandwidth measured at 500 meters and the bandwidth measured at 8 kilometers.

This overfilled-launch-bandwidth difference is denoted ΔB, where:

$$\Delta B = \frac{OFL-BW_{8km} - OFL-BW_{0.5km}}{OFL-BW_{8km}}.$$

The overfilled-launch-bandwidth difference ΔB can be used as a key indicator of leakage losses and is given for two wavelengths, namely 850 nanometers and 1300 nanometers.

Derived core-size measurements may be performed in accordance with IEC 60793-1-20 Method C. The IEC 60793-1-20 technical report is hereby incorporated by reference in its entirety. The IEC 60793-1-20 Method C determines the cross-sectional diameter of an optical fiber's central core by analyzing the near-field light distribution—also called near-field pattern—on a cross-section at the end of the optical fiber under OFL and by calculating the core diameter with or without curve fitting. The core sizes of the optical fibers at a wavelength of 850 nanometers are derived using IEC 60793-1-20 Method C, without curve fitting, directly from the measured pattern at the k level with k=2.5%. This measured core-size value is denoted $\Phi_{core}$. Typically, the measured core-size value $\Phi_{core}$ is compared with the graded-index core diameter.

EXAMPLE T1

Example T1 is an exemplary optical fiber having a refractive index profile as depicted in FIG. 2. As shown in Table I, the central core's outer radius R1 is 25.5 microns and the outer depressed cladding's outer radius R4 is 40 microns. The value of Δn1−Δn2 is 15.8×10$^{-3}$. The depressed trench has a refractive index difference $\Delta n_{trench}$ with respect to the outer depressed cladding of −2×10$^{-3}$, a volume $V_{trench}$ of 3285× 10$^{-3}$ μm$^2$, and a width w2 of 8.5 microns. In addition, the depressed trench is located 1 micron from the central core's outer radius R1 (i.e., the inner depressed cladding's width w1 is 1 micron).

Example T1's performance characteristics are given in Table II. The overfilled launch bandwidth measured for 1000 meters of the optical fiber is 1900 MHz·km at 850 nanometers and 1660 MHz·km at 1300 nanometers. In addition, the value of ΔB is respectively 0.5 percent and 13.0 percent for wavelengths of 850 nanometers and 1300 nanometers. The value of ΔB is less than 10 percent for the wavelength of 850 nanometers and less than 30 percent for the wavelength of 1300 nanometers. Furthermore, the core size $\Phi_{core}$ is equal to 52.6 microns.

Example T1 should be compared with comparative Example 1. Example 1 corresponds to a down-doped multimode optical fiber (i.e., a depressed graded-index multimode optical fiber) with the same core dimensions and the outer cladding positioned at the same radius from the center of the core. Example 1, however, does not include a depressed trench. Accordingly, for Example 1 the values of the central core's outer radius R1, the radius R4, and Δn1−Δn2 are the same as Example T1, but, as expected, the values $\Delta n_{trench}$ and the volume of the depressed trench $V_{trench}$ are zero.

As shown in Table II, 1000 meters of the optical fiber according to Example 1 exhibits an overfilled launch bandwidth of 1850 MHz·km at 850 nanometers and 1450 MHz·km at 1300 nanometers. In addition, the value of ΔB is respectively 4.0 percent and 31.2 percent for wavelengths of 850 nanometers and 1300 nanometers. Furthermore, the core size $\Phi_{core}$ is equal to 50.8 microns.

Thus, compared with the optical fiber according to Example 1, the optical fiber according to Example T1 has a value of ΔB that is reduced at both 850 nanometers and 1300 nanometers. The addition of a depressed trench does not penalize the overfilled launch bandwidth, because overfilled launch bandwidths for Example T1 exceed those of Example 1. Furthermore, the effect of leaky modes sustained by the depressed trench is limited, because measured core size on a two-meter optical fiber does not differ by more than 2 microns from the actual diameter of the graded-index central core (i.e., 2×R1).

The different performance characteristics of optical fibers according to Example T1 and Example 1 can be explained by the different refractive index profiles of the two optical fibers. Indeed, with the absence of a depressed trench, the outer cladding of Example 1 is too close to the graded-index core, which results in high leakage losses for the highest-order core modes. Consequently, in Example 1, the highest-order core modes (i.e., the highest-order guided modes that are desired) are strongly attenuated with optical-fiber length and do not contribute to the modal bandwidth calculation at longer optical-fiber lengths. In Example 1, because the number of modes sustained by the optical fiber is strongly reduced with longer optical-fiber lengths, the overfilled launch bandwidth will increase with optical-fiber length, but measured core size will decrease. Thus, the overfilled launch bandwidth becomes strongly dependent on optical-fiber length, especially at 1300 nanometers (e.g., ΔB is greater than 30 percent) where leakage losses are higher. Furthermore, attenuation is likely higher than for an optical fiber with a depressed trench.

Thus, Example T1 exhibits improved performance characteristics as compared with Example 1. Indeed, the attenuation as well as the length dependence of overfilled launch bandwidths, core size, and numerical aperture are reduced for a given outer cladding position.

EXAMPLE T2

Example T2 is an exemplary optical fiber having a refractive index profile as depicted in FIG. 2. Compared with Example T1, Example T2 has the same refractive-index-profile parameters except for the depressed trench. As shown in Table I, Example T2 includes a depressed trench having a refractive index difference $\Delta n_{trench}$ of $-3\times10^{-3}$, a volume $V_{trench}$ of $4276\times10^{-3}$ µcm$^2$, and a width w2 of 7.5 microns. The distance between the graded-index core and the depressed trench (i.e., w1) is the same as in Example T1.

Example T2's performance characteristics are given in Table II. More specifically, the overfilled launch bandwidth measured for 1000 meters of the optical fiber is 4170 MHz·km at 850 nanometers and 1700 MHz·km at 1300 nanometers. The value of ΔB is respectively 0.1 percent and −0.9 percent at wavelengths of 850 nanometers and 1300 nanometers. The value of ΔB is less than 10 percent at 850 nanometers and less than 30 percent at 1300 nanometers. Furthermore, the core size $\Phi_{core}$ is 52.4 microns.

Example T2 can also be compared with Example 1. The optical fiber according to Example T2 has a value of ΔB that is lower than Example 1's ΔB value at both 850 nanometers and 1300 nanometers. In addition, adding a depressed trench (as in Example T2) does not penalize the overfilled launch bandwidth. For Example T2, overfilled launch bandwidth measured over 1 kilometer at 850 nanometers and 1300 nanometers is greater than for Example 1. Furthermore, the effect of additional leaky-modes sustained by the depressed trench is limited, because measured core size on a two-meter optical fiber does not differ by more than 2 microns from the diameter of the graded-index central core (i.e., 2×R1). Therefore, as with Example T1, the optical fiber according to Example T2 exhibits improved performance characteristics as compared with the optical fiber of Example 1. Indeed, the attenuation and the length dependence of overfilled launch bandwidths, core size, and numerical aperture are reduced for a given outer cladding position.

EXAMPLE T3

Compared with Example T2, Example T3 has the same refractive-index-profile parameters except the depressed trench's width w2 is 3 microns rather than 7.5 microns as in Example T2. Consequently, the depressed trench's volume $V_{trench}$ is $1583\times10^{-3}$ µm$^2$ rather than $4276\times10^{-3}$ µm$^2$ as in Example T2. In Example T3, the depressed trench's outer radius R3 is 29.5 microns (i.e., R1+w1+w2 from Table I).

As shown in Table II, for Example T3, the value of ΔB is respectively 10.0 percent and 5.5 percent at wavelengths of 850 nanometers and 1300 nanometers. The value of ΔB is substantially increased at 850 nanometers compared with Examples T1 and T2, which have the same outer cladding position but larger depressed-trench volumes. Thus, Example T3's depressed-trench volume less effectively limits the leakage losses of the highest-order core modes, especially at 850 nanometers. As a consequence, the optical fiber of Example T3 suffers from an overfilled launch bandwidth that is dependent on optical-fiber length.

EXAMPLE T4

Example T4 is another exemplary optical fiber having a refractive index profile as depicted in FIG. 2. The depressed trench has a refractive index difference $\Delta n_{trench}$ of $-4\times10^{-3}$, a volume $V_{trench}$ of $3619\times10^{-3}$ µm$^2$, and a width w2 of 5 microns. The inner depressed cladding's width w1 is 0.8 micron.

As shown in Table II, for Example T4, the overfilled launch bandwidth measured for 1000 meters of the optical fiber is 2225 MHz·km at 850 nanometers and 640 MHz·km at 1300 nanometers. In addition, the value of ΔB is respectively 0.2 percent and 22.5 percent at wavelengths of 850 nanometers and 1300 nanometers. The value of ΔB is less than 10 percent at 850 nanometers and less than 30 percent at 1300 nanometers. Furthermore, the core size $\Phi_{core}$ is 52.4 microns.

Example T4 may be compared with Example 1. The value of ΔB is reduced for both wavelengths, and significantly reduced at 850 nanometers. These results indicate that leakage losses have been particularly reduced at 850 nanometers as compared with the same optical fiber without a depressed trench.

Figure 3:
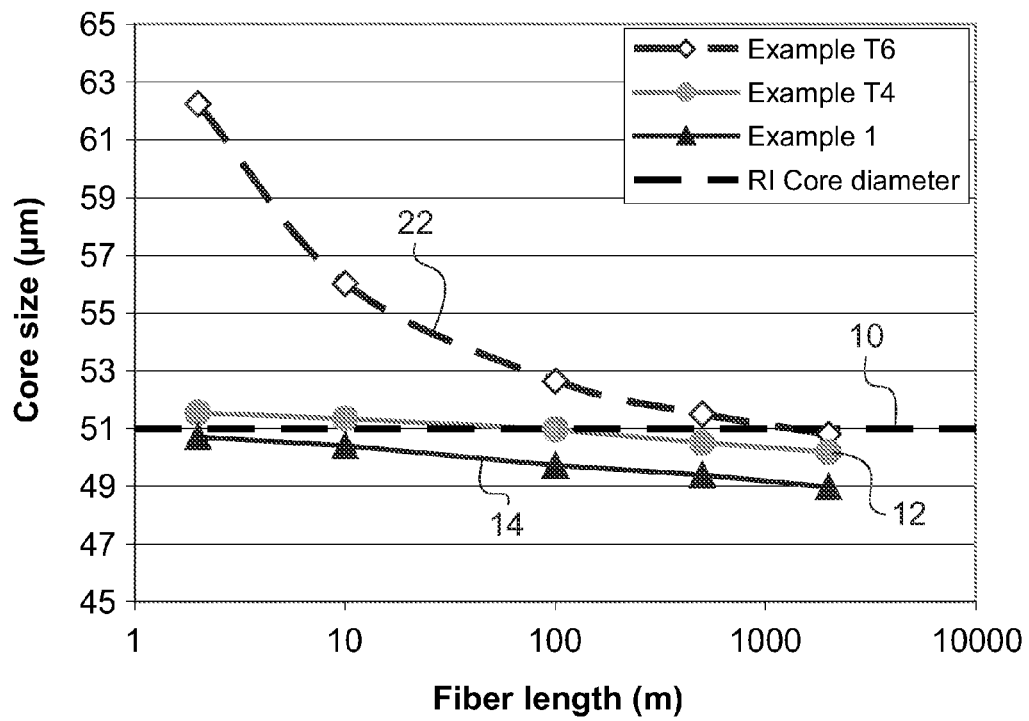
FIG. 3 graphically depicts measured optical core size as a function of optical-fiber length.

FIG. 3 provides additional information comparing the measured core sizes of Example 1 and Example T4. Indeed, FIG. 3 graphically depicts measured optical core size as a function of optical-fiber length between 2 meters and 2 kilometers. Curve 10 represents the 51-micron diameter of the graded-index central core (i.e., 2×R1). This 51-micron diameter is a refractive-index-profile parameter and is thus independent of optical-fiber length. FIG. 3 also includes curves 12 and 14, which respectively represent the measured optical core size for Example T4 and Example 1 as a function of optical-fiber length. The comparison of curves 12 and 14 shows that the measured core size for curve 12 is (i) nearer to curve 10 than curve 14 and (ii) less dependent upon optical-fiber length. Thus, the optical fiber according to Example T4 has better performance characteristics than the optical fiber according to Example 1. The difference between curves 12 and 14 also indicates that Example T4 exhibits lower leakage losses than Example 1. In other words, the depressed trench of Example T4 confines the desired guided modes of the graded-index central core (as evidenced by the low measured-core-size length dependence) while limiting the presence of additional leaky modes introduced by the depressed trench (as evidenced by a core size close to the graded-index central core's diameter).

Figure 4:
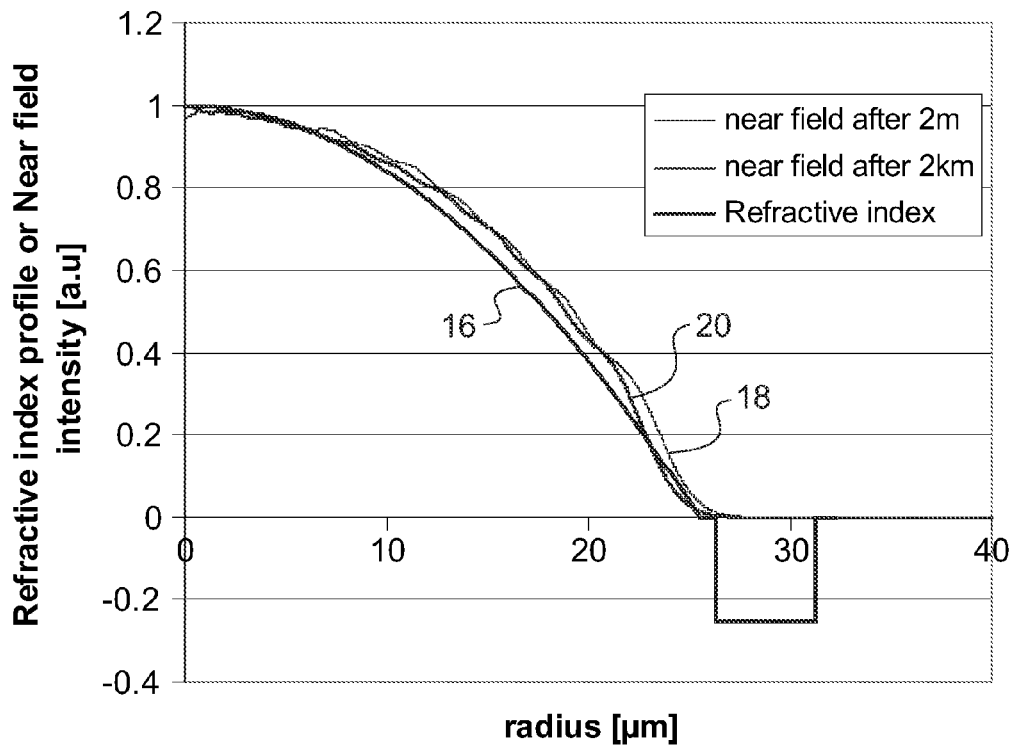
FIG. 4 graphically depicts refractive index and near-field intensity as a function of radial offset for an exemplary optical fiber.

FIG. 4 also supports the conclusion that Example T4 has better performance characteristics than the optical fiber according to Example 1. FIG. 4 graphically depicts, in arbitrary units, refractive index and near-field intensity as a function of radial offset for an exemplary optical fiber according to Example T4. Curve 16 represents the refractive index profile. Curve 18 represents the near-field intensity after light propagation over 2 meters of the optical fiber. Curve 20 represents the near-field intensity after light propagation over 2 kilometers of the optical fiber. FIG. 4 shows that optical-fiber length only slightly modifies the near-field pattern and that near-field pattern closely correlates to the graded-index central core's refractive index profile.

Accordingly, as with Example T1 and Example T2, the optical fiber according to Example T4 exhibits improved performance characteristics as compared with Example 1. Indeed, the attenuation as well as the length dependence of overfilled launch bandwidths, core size, and numerical aperture are reduced for a given outer cladding position.

EXAMPLE T5

Example T5 is another exemplary optical fiber having a refractive index profile as depicted in FIG. 2. The depressed trench has a refractive index difference $\Delta n_{trench}$ of $-4 \times 10^{-3}$, a volume $V_{trench}$ of $3707 \times 10^{-3}$ $\mu m^2$, and a width w2 of 5 microns. The inner depressed cladding's width w1 is 1.5 microns.

Example T5's performance characteristics are given in Table II. The value of $\Delta B$ is respectively 0.2 percent and 9.3 percent for wavelengths of 850 nanometers and 1300 nanometers. The value of $\Delta B$ is less than 10 percent at 850 nanometers and less than 30 percent at 1300 nanometers. Furthermore, the core size $\Phi_{core}$ is 52.47 microns, which means that the measured core size is within 2 microns of the graded-index central core's outer diameter (i.e., 2×R1). Example T5 includes a depressed trench having the same width w1 and refractive index difference $\Delta n_{trench}$ as Example T4's depressed trench, but Example T5 includes an inner depressed cladding that is wider (i.e., larger w1) than Example T4's inner depressed cladding. Thus, Example T5's depressed trench is further from the central core than Example T4's depressed trench. As shown in Table II, this modification improves overfilled launch bandwidth at 1300 nanometers and only slightly decreases overfilled launch bandwidth at 850 nanometers. Example T5 exhibits a measured core size, however, that is slightly larger than Example T4's measured core size (i.e., less than 2 microns larger).

Example T5 can also be compared with Example 1. The optical fiber according to Example T5 has a value of $\Delta B$ that is lower than Example 1's $\Delta B$ value at both 850 nanometers and 1300 nanometers. Therefore, as with Example T2 and Example T4, the optical fiber according to Example T5 exhibits improved performance characteristics as compared with Example 1, particularly with respect to leakage losses. Indeed, the attenuation as well as the length dependence of overfilled launch bandwidths, core size, and numerical aperture are reduced for a given outer cladding position.

EXAMPLE T6

Example T6 is another exemplary optical fiber having a refractive index profile as depicted in FIG. 2. Compared with Example T4 and Example T5, Example T6 has the same refractive-index-profile parameters, but Example T6 includes an inner depressed cladding that is wider (i.e., larger w1) than the inner depressed claddings of Example T4 and Example T5. Thus, Example T6's depressed trench is farther from the central core than the depressed trenches of Example T4 and Example T5.

For Example T6, the depressed trench has a refractive index difference $\Delta n_{trench}$ of $-4 \times 10^{-3}$, a volume $V_{trench}$ of $4398 \times 10^{-3}$ $\mu m^2$, and a width w2 of 5 microns. The inner depressed cladding's width w1 is 7 microns.

As shown in Table II, the optical fiber according to Example T6 exhibits an overfilled launch bandwidth measured for 1000 meters of the optical fiber is 1120 MHz·km at 850 nanometers and 1035 MHz·km at 1300 nanometers. In addition, the value of $\Delta B$ is respectively 0.9 percent and 5.1 percent for wavelengths of 850 nanometers and 1300 nanometers. Furthermore, the core size $\Phi_{core}$ is equal to 62.2 microns.

For Example T4 and Example T5, the depressed trench volume $V_{trench}$ is large enough to limit the leakage losses. Consequently, $\Delta B$ is strongly reduced compared with comparative Example 1, which has the same central-core dimensions and same outer cladding position but no depressed trench. For Example T6, however, the depressed trench is not positioned effectively. Additional leaky modes supported by the depressed trench have leakage losses that are too low, thereby strongly distorting the core size measurement. Consequently, the measured core size for the optical fiber according to Example T6 is more than 12 microns greater than the central core diameter from the refractive index profile.

FIG. 3 provides additional information comparing the measured core sizes of Example 1 and Example T6. Indeed, FIG. 3 graphically depicts measured optical core size as a function of optical-fiber length between 2 meters and 2 kilometers. As noted, curve 10 represents the 51-micron diameter of the graded-index central core (i.e., 2×R1). FIG. 3 also includes curve 22, which represents the measured optical core size for Example T6 as a function of optical-fiber length. A comparison of curves 14 and 22 shows that the measured core size for curve 14 is nearer to curve 10 than curve 22. This indicates that the depressed trench of Example T6 is too far from the central core. Consequently, too many leaky modes propagate over short optical-fiber lengths, which increases the measured core size for short optical-fiber lengths.

Figure 5:
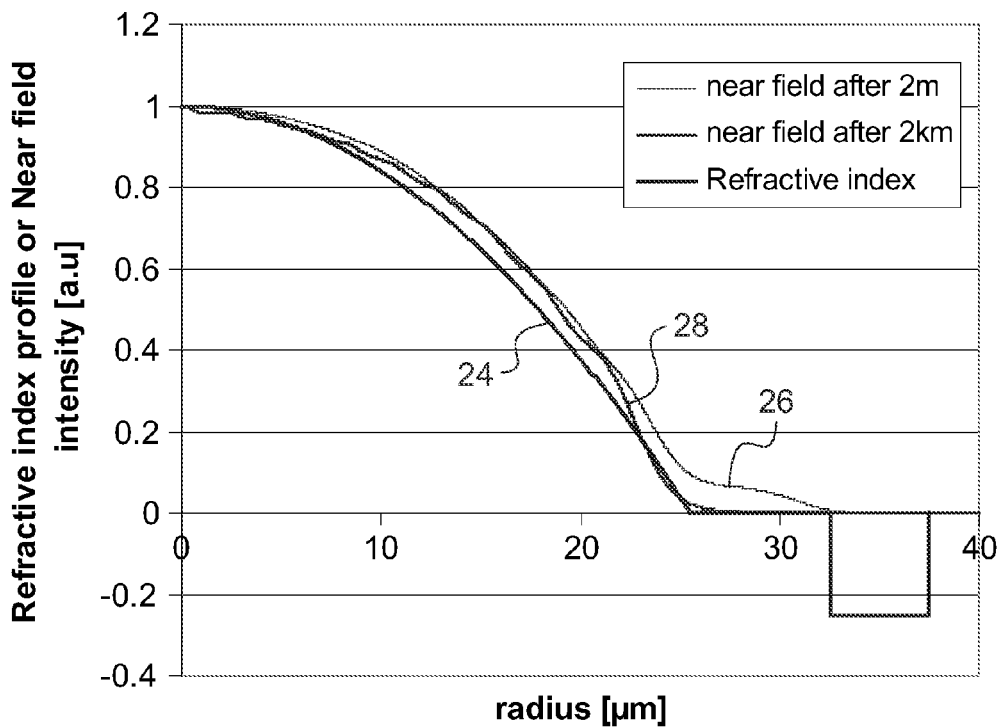
FIG. 5 graphically depicts refractive index and near-field intensity as a function of radial offset for another exemplary optical fiber.

Furthermore, FIG. 5 graphically depicts, in arbitrary units, refractive index and near-field intensity as a function of radial offset for Example T6. Curve 24 represents the refractive index profile. Curve 26 represents the near-field intensity after light propagation over 2 meters of the optical fiber. Curve 28 represents the near-field intensity after light propagation over 2 kilometers of the optical fiber. FIG. 5 shows that optical-fiber length significantly affects the near-field pattern. Additionally, the diameter of the graded-index central core as determined by analyzing curve 26 according to the IEC 60793-1-20, Method C will be much larger than the one measured by analyzing curve 28. Thus, Example T6 does not control the leaky modes in the same manner as Example T4. Indeed, as noted, the depressed trench of Example T6 is too far from the central core, and so too many leaky modes propagate over short optical-fiber lengths (e.g., increasing the measured core size for short optical-fiber lengths).

EXAMPLE T7

Example T7 is another exemplary optical fiber having a refractive index profile as depicted in FIG. 2. The central core has an outer radius R1 of 25.5 microns, and the outer depressed cladding has an outer radius R4 of 35 microns. The value of $\Delta n1-\Delta n2$ is $15.8\times10^{-3}$. The depressed trench has a refractive index difference $\Delta n_{trench}$ of $-4\times10^{-3}$, a volume $V_{trench}$ of $3707\times10^{-3}$ µm², and a width w2 of 5 microns. The inner depressed cladding's width w1 is 1.5 microns.

As shown in Table II, for Example T7, the overfilled launch bandwidth measured for 1000 meters of the optical fiber is 2015 MHz·km at 850 nanometers and 2140 MHz·km at 1300 nanometers. In addition, the value of $\Delta B$ is respectively 2.9 percent and 3.7 percent at wavelengths of 850 nanometers and 1300 nanometers. The value of $\Delta B$ is less than 10 percent at 850 nanometers and less than 30 percent at 1300 nanometers. Furthermore, the core size $\Phi_{core}$ is 52.7 microns.

Example T7 may be compared with Example 2. Example 2 corresponds to a down-doped multimode optical fiber (i.e., a depressed graded-index multimode optical fiber) with the same core dimensions and the outer cladding positioned at same radius from the center of the core. Example 2, however, does not include a depressed trench. Accordingly, for Example 2, the values of the central core's outer radius R1, the radius R4, and $\Delta n1-\Delta n2$ are the same as in Example T7, but, of course, the values $\Delta n_{trench}$ and the volume of the depressed trench $V_{trench}$ are zero.

As shown in Table II, the optical fiber according to Example 2 exhibits an overfilled launch bandwidth measured for 1000 meters of optical fiber of 1970 MHz·km at 850 nanometers and 2110 MHz·km at 1300 nanometers. In addition, the value of $\Delta B$ is respectively 11.3 percent and 39.6 percent for wavelengths of 850 nanometers and 1300 nanometers. Furthermore, the core size $\Phi_{core}$ is equal to 49.7 microns.

Thus, the optical fiber according to Example T7 has a value of $\Delta B$, which is reduced at both 850 nanometers and 1300 nanometers as compared with Example 2. The addition of a depressed trench does not penalize the overfilled launch bandwidth, because overfilled launch bandwidths for Example T7 are greater than those of Example 2. Although the addition of a depressed trench in Example T7 increases measured core size on a two-meter optical fiber, the measured core size does not differ by more than 2 microns from the actual diameter of the graded-index central core (i.e., 2×R1).

Figure 6:
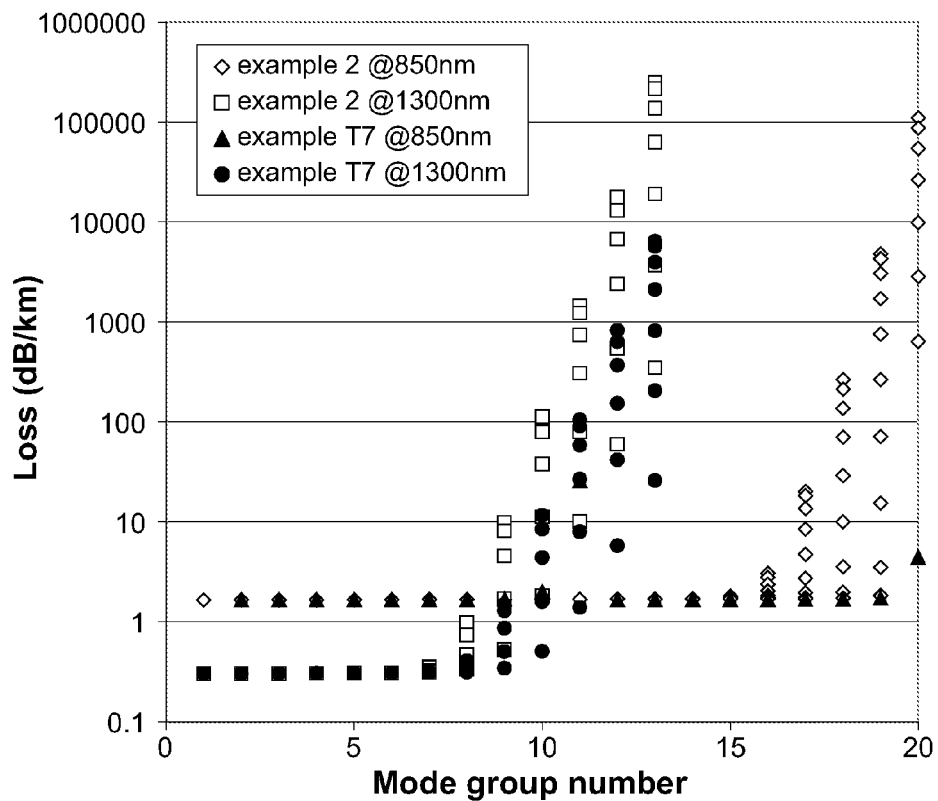
FIG. 6 graphically depicts losses as a function of group mode number for a comparative optical fiber and an exemplary optical fiber.

FIG. 6 further demonstrates that Example T7 more effectively controls leaky modes than Example 2. FIG. 6 graphically depicts losses (dB/km) as a function of group mode number for Example T7 and Example 2. For each optical fiber, one data set reflects measurements at 850 nanometers, and the other data set reflects measurements at 1300 nanometers.

In particular, for Example 2, the diamond-shaped data points represent losses at 850 nanometers and the square-shaped data points represent losses at 1300 nanometers. For Example T7, the triangle-shaped data points represent losses at 850 nanometers and the circle-shaped data points represent losses at 1300 nanometers.

As shown in FIG. 6, for the highest-order core modes of Example 2, the losses are much higher than those of Example T7. Example 2 has losses around 2 dB/km and 0.8 dB/km at 850 nanometers and 1300 nanometers, respectively. Example T7 has losses around 1.9 dB/km and 0.5 dB/km at 850 nanometers and 1300 nanometers, respectively.

Therefore, Example T7 exhibits improved performance characteristics as compared with Example 2. Indeed, the attenuation as well as the length dependence of overfilled launch bandwidths, core size, and numerical aperture are reduced for a given outer cladding position.

EXAMPLE T8

Compared with Example T7, Example T8 has the same refractive-index-profile parameters, but Example T8 includes an inner depressed cladding that is narrower (i.e., smaller w1) than the inner depressed cladding of Example T7. Thus, Example T8's depressed trench is closer to the central core than the depressed trench of Example T7. For Example T8, the inner depressed cladding's width w1 is 0.5 micron, and the depressed trench has a volume $V_{trench}$ of $3581\times10^{-3}$ µm².

As shown in Table II, for Example T8, the overfilled launch bandwidth measured for 1000 meters of the optical fiber is 1690 MHz·km at 850 nanometers and 590 MHz·km at 1300 nanometers. In addition, the value of $\Delta B$ is respectively 1.2 percent and 40.9 percent at wavelengths of 850 nanometers and 1300 nanometers. Furthermore, the core size $\Phi_{core}$ is 51.6 microns. Because the depressed trench is so close to the graded-index central core, Example T8 exhibits overfilled launch bandwidths that are less than those of Example T7.

Furthermore, although Example T8's depressed trench has a volume $V_{trench}$ that is close to that of Example T7, the position of Example T8's depressed trench fails to facilitate the achievement of a low $\Delta B$ at 1300 nanometers. Consequently, $\Delta B$ is much higher than 30 percent for Example T8.

EXAMPLE T9

Example T9 is another exemplary optical fiber having a refractive index profile as depicted in FIG. 2. Compared with Example T7, Example T9 has the same refractive-index-profile parameters except the depressed trench's refractive index difference $\Delta n_{trench}$ is $-7\times10^{-3}$ rather than $-4\times10^{-3}$ as in Example T7. Accordingly, Example T9 also has a larger depressed-trench volume $V_{trench}$ of $6487\times10^{-3}$ µm² than Example T7.

As shown in Table II, for Example T9, the overfilled launch bandwidth measured for 1000 meters of the optical fiber is 3250 MHz·km at 850 nanometers and 875 MHz·km at 1300 nanometers. In addition, the value of $\Delta B$ is respectively 2.0 percent and 24.6 percent at wavelengths of 850 nanometers and 1300 nanometers. Furthermore, the core size $\Phi_{core}$ is 53.2 microns.

For the optical fiber of Example T9, the depressed trench's volume $V_{trench}$ is large enough to limit the optical-fiber-length dependence of overfilled launch bandwidth, particularly at 850 nanometers. That said, the depressed trench's depth (i.e., the absolute value of the depressed trench's refractive index difference $\Delta n_{trench}$) and the depressed trench's volume $V_{trench}$ are too large. Consequently, too many leaky modes propagate over short optical-fiber lengths. This disturbs the near-field pattern and increases the measured core size for short optical-fiber lengths. Indeed, the measured core size is greater than 53 microns (i.e., more than two microns greater than the actual diameter of the graded-index central core, 2×R1). Accordingly, measured core size is optical-fiber-length dependent. This leads to distorted core-size measurements, which can be detrimental for connectivity purposes.

EXAMPLE T10

Example T10 is another exemplary optical fiber having a refractive index profile as depicted in FIG. 2. Example T10 has the same refractive-index-profile parameters at Example T9, but Example T10 includes an inner depressed cladding that is wider (i.e., larger w1) than Example T9's inner depressed cladding. Thus, Example T10's depressed trench is farther from the central core than Example T9's depressed trench.

For Example T10, the depressed trench has a refractive index difference $\Delta n_{trench}$ of $-7 \times 10^{-3}$, a volume $V_{trench}$ of $6482 \times 10^{-3}$ µm², and a width w2 of 4.5 microns. The inner depressed cladding's width w1 is 5 microns.

As shown in Table II, for Example T10, the overfilled launch bandwidth measured for 1000 meters of the optical fiber is 1225 MHz·km at 850 nanometers and 1220 MHz·km at 1300 nanometers. In addition, the value of ΔB is respectively 0.4 percent and 4.3 percent at wavelengths of 850 nanometers and 1300 nanometers. Furthermore, the core size $\Phi_{core}$ is 59.9 microns.

For the optical fiber of Example T10, the depressed trench's volume $V_{trench}$ is large enough to limit the optical-fiber-length dependence of overfilled launch bandwidth at 850 nanometers and 1300 nanometers. The depressed trench's volume $V_{trench}$, however, is too large, too deep, and too far from the graded-index central core. Consequently, too many leaky modes propagate over short optical-fiber lengths, which disturbs the near-field pattern and increases the measured core size for short optical-fiber lengths. Indeed, the measured core size is greater than 53 microns (i.e., more than two microns greater than the actual diameter of the graded-index central core, 2×R1). Accordingly, measured core size is optical-fiber-length dependent. This leads to distorted core-size measurements, which can be detrimental for connectivity purposes.

EXAMPLE T11

Example T11 is another exemplary optical fiber having a refractive index profile as depicted in FIG. 2. The depressed trench has a refractive index difference $\Delta n_{trench}$ of $-3.6 \times 10^{-3}$, a volume $V_{trench}$ of $3788 \times 10^{-3}$ µm², and a width w2 of 5.5 microns. The inner depressed cladding's width w1 is 1.5 microns. The outer depressed cladding's outer radius R4 is 46.5 microns.

Example T11's performance characteristics are given in Table II. The value of ΔB is respectively 0.2 percent and 0.6 percent at wavelengths of 850 nanometers and 1300 nanometers, which are extremely low. Furthermore, the core size $\Phi_{score}$ is equal to 53.7 microns, which means that measured core size on a two-meter optical fiber does not differ by more than 2 microns from the diameter of the graded-index central core (i.e., 2×R1).

Example T11 exhibits low leakage losses. Indeed, the attenuation as well as the length dependence of overfilled launch bandwidths, core size, and numerical aperture are reduced for a given outer cladding position.

EXAMPLE T12

Example T12 is another exemplary optical fiber having a refractive index profile as depicted in FIG. 2. The depressed trench has a refractive index difference $\Delta n_{trench}$ of $-5 \times 10^{-3}$, a volume $V_{trench}$ of $3644 \times 10^{-3}$ µm², and a width w2 of 4 microns. The inner depressed cladding's width w1 is 2 microns. The outer depressed cladding's outer radius R4 is 32 microns.

Example T12's performance characteristics are given in Table II. The value of ΔB is respectively 6.0 percent and 6.9 percent at wavelengths of 850 nanometers and 1300 nanometers (i.e., both values are less than 10 percent). Furthermore, the core size $\Phi_{core}$ is equal to 49.6 microns, which means that measured core size on a two-meter optical fiber does not differ by more than 2 microns from the diameter of the graded-index central core (i.e., 2×R1).

Example T12 exhibits low leakage losses. Indeed, the attenuation as well as the length dependence of overfilled launch bandwidths, core size, and numerical aperture are reduced for a given outer cladding position.

Example T12 can also be compared with Example 3. Example 3 corresponds to a down-doped multimode optical fiber (i.e., a depressed graded-index multimode optical fiber) with the same core dimensions. Example 3, however, does not include a depressed trench. Additionally, the radius R4 of Example 3 is 41 microns. Accordingly, the outer cladding of Example 3 is farther from the central core than the outer cladding of Example 12. The larger radius R4 of Example 3 (i.e., 9 microns larger radially as compared with Example 12) facilitates the achievement of a ΔB value of less than 10 percent at 850 nanometers and less than 30 percent at 1300 nanometers. As noted, however, manufacturing a depressed optical fiber with an external cladding positioned closer to the core is easier and cheaper. Therefore, the manufacturing costs for the optical fiber of Example T12 are reduced without deteriorating optical-fiber performance (i.e., overfilled launch bandwidths, core size, numerical aperture, attenuation).

In view of the foregoing, Examples T1, T2, T4, T5, T7, T11 and T12 are exemplary multimode optical fibers including (i) a central core with an outer radius R1 (e.g., a first radius R1) and an alpha-profile with a maximum optical-core refractive index, (ii) an inner depressed cladding extending radially from the central core's outer radius R1 to an outer radius R2 (e.g., a second radius R2), (iii) a depressed trench extending from the inner depressed cladding's outer radius R2 to an outer radius R3 (e.g., a third radius R3), (iv) an outer depressed cladding extending radially from the depressed trench's outer radius R3 to an outer radius R4 (e.g., a fourth radius R4), and (v) an external cladding extending radially from the outer depressed cladding's outer radius R4. Moreover, for each optical fiber according to these examples, the volume of the trench $V_{trench}$ is between $1650 \times 10^{-3}$ µm² and $4500 \times 10^{-3}$ µm², the difference between the second radius R2 and the first radius R1 is between 0.6 micron and 3.5 microns, and the fourth radius R4 is between 30 microns and 47 microns. In addition, the difference in distance between the third radius R3 and the second radius R2 (i.e., the trench width w2) is between 2.4 microns and 10 microns.

These exemplary optical fibers exhibit improved performance characteristics. Furthermore, exemplary optical fibers are low-loss, depressed graded-index, 50-micron multimode optical fibers that have central core outer radii of about 47 microns or less, yet control leakage losses.

In addition, at a wavelength of 850 nanometers, exemplary optical fibers have an overfilled launch (OFL) bandwidth of 500 MHz·km or greater (e.g., 1000 MHz·km or greater). At a wavelength of 1300 nanometers, exemplary optical fibers have an overfilled launch (OFL) bandwidth of about 500 MHz·km or greater (e.g., about 1000 MHz·km or greater). Furthermore, at a wavelength of 850 nanometers using the near-field technique, the measured optical core size for a two-meter sample of an exemplary optical fiber is equal to the central core's outer radius R1 with a tolerance of ±2 microns. At a wavelength of 850 nanometers, exemplary optical fibers also exhibit an overfilled launch bandwidth measured over 500 meters that is decreased by less than 10 percent as compared with the overfilled launch bandwidth measured over 8 kilometers. Similarly, at a wavelength of 1300 nanometers, exemplary optical fibers exhibit an overfilled launch bandwidth measured over 500 meters that is decreased by less than 30 percent as compared with the overfilled launch bandwidth measured over 8 kilometers.

Furthermore, exemplary optical fibers have refractive index profiles that facilitate a reduction in manufacturing costs by reducing the radial distance between the outer cladding and the central core's outer radius, without deteriorating optical-fiber performance characteristics (i.e., overfilled launch bandwidths, core size, numerical aperture, attenuation).

In another aspect, the present invention embraces a method of manufacturing a multimode optical fiber in accordance with the foregoing (e.g., using PCVD techniques, fluorine doping, and/or fluorine-doped deposition tubes).

\* \* \*

The present optical fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter might be worthwhile for some optical-fiber applications.

As noted, the present optical fibers may include one or more coating layers (e.g., a primary coating and a secondary coating). At least one of the coating layers —typically the secondary coating —may be colored and/or possess other markings to help identify individual fibers. Alternatively, a tertiary ink layer may surround the primary and secondary coatings.

\* \* \*

As noted, the present optical fibers may be manufactured by drawing from final preforms.

A final preform may be manufactured by providing a primary preform with an outer overcladding layer (i.e., an overcladding process). The outer overcladding layer typically consists of doped or undoped, natural or synthetic, silica glass. Several methods are available for providing the outer overcladding layer.

In a first exemplary method, the outer overcladding layer may be provided by depositing and vitrifying natural or synthetic silica particles on the outer periphery of the primary preform under the influence of heat. Such a process is known, for example, from U.S. Pat. Nos. 5,522,007, 5,194,714, 6,269,663, and 6,202,447, each of which is hereby incorporated by reference in its entirety.

In another exemplary method, a primary preform may be overcladded using a silica sleeve tube, which may or may not be doped. This sleeve tube may then be collapsed onto the primary preform.

In yet another exemplary method, an overcladding layer may be applied via an Outside Vapor Deposition (OVD) method. Here, a soot layer is first deposited on the outer periphery of a primary preform, and then the soot layer is vitrified to form glass.

Primary preforms may be manufactured via outside vapor deposition techniques, such as Outside Vapor Deposition (OVD) and Vapor Axial Deposition (VAD). Alternatively, primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD).

By way of example, primary preforms may be manufactured using a PCVD process, which can precisely control the central core's gradient refractive index profile.

A depressed trench, for instance, may be deposited on the inner surface of a substrate tube as part of the chemical vapor deposition process. Alternatively, a depressed trench may be manufactured either (i) by using a fluorine-doped substrate tube as the starting point of the internal deposition process for deposition of the gradient refractive index central core or (ii) by sleeving a fluorine-doped silica tube over the gradient refractive index central core, which itself may be produced using an outside deposition process (e.g., OVD or VAD). Accordingly, a component glass fiber manufactured from the resulting preform may have a depressed trench located near the periphery of its central core.

As noted, a primary preform may be manufactured via an inside deposition process using a fluorine-doped substrate tube. The resulting tube containing the deposited layers may be sleeved by one or more additional fluorine-doped silica tubes so as to increase the thickness of a depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

\* \* \*

The present optical fibers may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation), it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished helically in one direction, known as "S" or "Z" stranding, or via Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or nonmetallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may either tightly surround or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations.

Thus, the present optical fibers may be deployed in dry cable structures (i.e., grease-free buffer tubes).

Exemplary buffer tube structures that are free from thixotropic filling greases are disclosed in commonly assigned U.S. Pat. No. 7,724,998 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Pat. No. 7,665,902 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylori. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FITC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound around a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

* * *

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the optical fiber, thereby increasing the optical fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase-shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

* * *

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Pat. No. 8,055,111 for a Dispersion-Shifted Optical Fiber (Sillard et al.); U.S. Pat. No. 8,041,172 for a Transmission Optical Fiber Having Large Effective Area (Sillard et al.); International Patent Application Publication No. WO 2009/062131A1 for a Microbend-Resistant Optical Fiber, (Overton); U.S. Patent Application Publication No. US2009/0175583 A1 for a Microbend-Resistant Optical Fiber, (Overton); U.S. Pat. No. 8,145,025 for a Single-Mode Optical Fiber Having Reduced Bending Losses (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Pat. No. 7,995,888 for a Multimode Optical Fibers, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burow et al.); U.S. Pat. No. 8,009,950 for a Multimode Fiber (Molin et al.); U.S.

Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. Patent Application Publication No. US2011/0116160 A1 for a Rare-Earth-Doped Optical Fiber Having Small Numerical Aperture, filed Nov. 11, 2010, (Boivin et al.); U.S. Patent Application Publication No. US2011/0123161 A1 for a High-Bandwidth, Multimode Optical Fiber with Reduced Cladding Effect, filed Nov. 24, 2010, (Molin et al.); U.S. Patent Application Publication No. US2011/0123162 A1 for a High-Bandwidth, Dual-Trench-Assisted Multimode Optical Fiber, filed Nov. 24, 2010, (Molin et al.); U.S. Patent Application Publication No. US2011/0135262 A1 for a Multimode Optical Fiber with Low Bending Losses and Reduced Cladding Effect, filed Dec. 3, 2010, (Molin et al.); U.S. Patent Application Publication No. US2011/0135263 A1 for a High-Bandwidth Multimode Optical Fiber Having Reduced Bending Losses, filed Dec. 3, 2010, (Molin et al.); U.S. Patent Application Publication No. US2011/0188826 A1 for a Non-Zero Dispersion Shifted Optical Fiber Having a Large Effective Area, filed Jan. 31, 2011, (Sillard et al.); U.S. Patent Application Publication No. US2011/0188823 A1 for a Non-Zero Dispersion Shifted Optical Fiber Having a Short Cutoff Wavelength, filed Jan. 31, 2011, (Sillard et al.); U.S. Patent Application Publication No. 2011/0217012 A1 for a Broad-Bandwidth Multimode Optical Fiber Having Reduced Bending Losses, filed Mar. 1, 2011, (Bigot-Astruc et al.); U.S. Patent Application Publication No. 2011/0229101 A1 for a Single-Mode Optical Fiber, filed Mar. 15, 2011, (de Montmorillon et al.); U.S. Patent Application Publication No. 2012/0051703 A1 for a Single-Mode Optical Fiber, filed Jul. 1, 2011, (Bigot-Astruc et al.); U.S. Patent Application Publication No. 2012/0040184 A1 for a Method of Fabricating an Optical Fiber Preform, filed Aug. 10, 2011, (de Montmorillon et al.); U.S. Patent Application Publication No. 2012/0092651 A1 for a Multimode Optical Fiber Insensitive to Bending Losses, filed Oct. 18, 2011, (Molin et al.); U.S. Patent Application Publication No. 2012/0134376 A1 for a Radiation-Insensitive Optical Fiber Doped with Rare Earths, filed Nov. 23, 2011, (Burow et al.); U.S. Patent Application Publication No. 2012/0148206 A1 for a Rare-Earth-Doped Optical Fiber, filed Dec. 9, 2011, (Boivin et al.); U.S. patent application Ser. No. 13/362,357 for a Broad-Bandwidth Optical Fiber, filed Jan. 31, 2012, (Molin et al.); U.S. patent application Ser. No. 13/362,395 for a Multimode Optical Fiber, filed Jan. 31, 2012, (Molin et al.); U.S. patent application Ser. No. 13/410,976 for a Rare-Earth-Doped Amplifying Optical Fiber, filed Mar. 2, 2012, (Burow et al.); U.S. patent application Ser. No. 13/428,520 for a Bend-Resistant Multimode Optical Fiber, filed Mar. 23, 2012, (Molin et al.); U.S. patent application Ser. No. 13/434,101 for a Multimode Optical Fiber, filed Mar. 29, 2012, (Molin et al.); U.S. patent application Ser. No. 13/456,562 for a High-Bandwidth, Radiation-Resistant Multimode Optical Fiber, filed Apr. 26, 2012, (Krabshuis et al.); U.S. patent application Ser. No. 13/481,150 for a Single-Mode Optical Fiber, filed May 25, 2012, (Sillard et al.); and U.S. patent application Ser. No. 13/491,953 for a Single-Mode Optical Fiber, filed Jun. 8, 2012, (Sillard et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No.

7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Pat. No. 8,195,018 for a Buffer Tube with Adhesively Coupled Optical Fibers and/or Water-Swellable Element; U.S. Patent Application Publication No. US2010/0092135 A1 for an Optical Fiber Cable Assembly, filed Sep. 10, 2009, (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Pat. No. 8,081,853 for Single-Fiber Drop Cables for MDU Deployments (Overton); U.S. Pat. No. 8,041,167 for an Optical-Fiber Loose Tube Cables (Overton); U.S. Pat. No. 8,145,026 for a Reduced-Size Flat Drop Cable (Overton et al.); U.S. Pat. No. 8,165,439 for ADSS Cables with High-Performance Optical Fiber (Overton); U.S. Pat. No. 8,041,168 for Reduced-Diameter Ribbon Cables with High-Performance Optical Fiber (Overton); U.S. Pat. No. 8,031,997 for a Reduced-Diameter, Easy-Access Loose Tube Cable (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Application Publication No. 2011/0069932 A1 for a High-Fiber-Density Optical-Fiber Cable, filed Oct. 19, 2010, (Overton et al.); U.S. Patent Application Publication No. 2011/0091171 A1 for an Optical-Fiber Cable Having High Fiber Count and High Fiber Density, filed Oct. 19, 2010, (Tatat et al.); U.S. Patent Application Publication No. 2011/0176782 A1 for a Water-Soluble Water-Blocking Element, filed Jan. 19, 2011, (Parris); U.S. Patent Application Publication No. 2011/0268400 A1 for a Data-Center Cable, filed Apr. 28, 2011, (Louie et al.); U.S. Patent Application Publication No. 2011/0268398 A1 for a Bundled Fiber Optic Cables, filed May 3, 2011, (Quinn et al.); U.S. Patent Application Publication No. 2011/0287195 A1 for a Curing Apparatus Employing Angled UVLEDs, filed May 19, 2011, (Molin); U.S. Patent Application Publication No. 2012/0009358 for a Curing Apparatus Having UV Sources That Emit Differing Ranges of UV Radiation, filed Jun. 3, 2011, (Gharbi et al.); U.S. Patent Application Publication No. 2012/0014652 A1 for a Adhesively Coupled Optical Fibers and Enclosing Tape, filed Jul. 13, 2011, (Parris); U.S. Patent Application Publication No. 2012/0040105 A1 for a Method and Apparatus Providing Increased UVLED Intensity, filed Aug. 10, 2011, (Overton); U.S. Patent Application Publication No. 2012/0057833 A1 for an Optical-Fiber Module Having Improved Accessibility, filed Aug. 31, 2011, (Tatat); U.S. patent application Ser. No. 13/401,026 for a Optical-Fiber Interconnect Cable, filed Feb. 21, 2012, (Risch et al.).

* * *

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A multimode optical fiber, comprising:
a central core surrounded by an outer cladding, said central core having (i) an outer radius R1, (ii) an alpha-index profile, (iii) a maximum refractive index difference $\Delta n1$ with respect to said outer cladding;
an inner depressed cladding positioned between said central core and said outer cladding, said inner cladding having (i) an outer radius R2, (ii) a width w1 of between about 0.6 micron and 3.5 microns, and (iii) a negative refractive index difference $\Delta n_{inner}$ with respect to said outer cladding;
a depressed trench positioned between said inner depressed cladding and said outer cladding, said buried trench having (i) an outer radius R3, (ii) a width w2, (iii) a negative refractive index difference $\Delta n_{trench}$ with respect to said outer depressed cladding, and (iv) a volume $V_{trench}$ of between about $1650 \times 10^{-3}$ $\mu m^2$ and $4500 \times 10^{-3}$ $\mu m^2$, the volume $V_{trench}$ defined as:

$$V_{trench} = 2\pi \left| \int_{R2}^{R3} \Delta n_{trench}(r) r\, dr \right|; \text{ and}$$

an outer depressed cladding positioned between said depressed trench and said outer cladding, said outer depressed cladding having (i) an outer radius R4 of between about 30 microns and 47 microns and (ii) a negative refractive index difference $\Delta n2$ with respect to said outer cladding.

2. The optical fiber according to claim 1, wherein said central core's maximum refractive index difference $\Delta n1$ with respect to said outer cladding is between about $-1.0 \times 10^{-3}$ and $0.8 \times 10^{-3}$.

3. The optical fiber according to claim 1, wherein said outer depressed cladding's refractive index difference Δn2 with respect to said outer cladding is between about $-18 \times 10^{-3}$ and $-12 \times 10^{-3}$.

4. The optical fiber according to claim 1, wherein said depressed trench's width w2 is between about 2.4 microns and 10 microns.

5. The optical fiber according to claim 1, wherein said depressed trench's refractive index difference $\Delta n_{trench}$ with respect to said outer depressed cladding is between about $-6 \times 10^{-3}$ and $-2 \times 10^{-3}$.

6. The optical fiber according to claim 1, wherein, at a wavelength of 850 nanometers, the optical fiber's overfilled launch bandwidth measured over 500 meters is at least about 90 percent of the optical fiber's overfilled launch bandwidth measured over 8 kilometers.

7. The optical fiber according to claim 1, wherein, at a wavelength of 1300 nanometers, the optical fiber's overfilled launch bandwidth measured over 500 meters is at least about 70 percent of the optical fiber's overfilled launch bandwidth measured over 8 kilometers.

8. The optical fiber according to claim 1, wherein the measured optical core size for 2 meters of the optical fiber is equal to said central core's outer radius R1 with a tolerance of ±2 microns.

9. The optical fiber according to claim 1, wherein said central core's outer radius R1 is between about 23 microns and 27 microns.

10. The optical fiber according to claim 1, wherein said depressed trench has a refractive index difference with respect to the outer cladding of between about $-24 \times 10^{-3}$ and $-14 \times 10^{-3}$.

11. The optical fiber according to claim 1, wherein said inner depressed cladding has a refractive index difference with respect to said outer depressed cladding of between about $-2 \times 10^{-3}$ and $2 \times 10^{-3}$.

12. The optical fiber according to claim 1, wherein said central core's alpha-index profile has an alpha parameter of between about 1.9 and 2.1.

13. The optical fiber according to claim 1, wherein, at a wavelength of 850 nanometers, the optical fiber has an overfilled launch bandwidth of about 500 MHz·km or greater.

14. The optical fiber according to claim 1, wherein, at a wavelength of 850 nanometers, the optical fiber has an overfilled launch bandwidth of about 1000 MHz·km or greater.

15. The optical fiber according to claim 1, wherein, at a wavelength of 1300 nanometers, the optical fiber has an overfilled launch bandwidth of about 500 MHz·km or greater.

16. The optical fiber according to claim 1, wherein, at a wavelength of 1300 nanometers, the optical fiber has an overfilled launch bandwidth of about 1000 MHz·km or greater.

17. A multimode optical fiber, comprising:
a central core surrounded by an outer cladding, said central core having (i) an outer radius R1 of between about 23 microns and 27 microns, (ii) an alpha-index profile with an alpha parameter of between about 1.9 and 2.1, (iii) a maximum refractive index difference Δn1 with respect to said outer cladding of between about $-1.0 \times 10^{-3}$ and $0.8 \times 10^{-3}$;
an inner depressed cladding immediately surrounding said central core, said inner cladding having (i) an outer radius R2, (ii) a width w1 of between about 0.6 micron and 3.5 microns, and (iii) a negative refractive index difference $\Delta n_{inner}$ with respect to said outer cladding;
a depressed trench immediately surrounding said inner depressed cladding, said buried trench having (i) an outer radius R3, (ii) a width w2 of between about 2.4 microns and 10 microns, (iii) a negative refractive index difference $\Delta n_{trench}$ with respect to said outer depressed cladding of between about $-6 \times 10^{-3}$ and $-2 \times 10^{-3}$, and (iv) a volume $V_{trench}$ of between about $1650 \times 10^{-3}$ μm² and $4500 \times 10^{-3}$ μm², the volume $V_{trench}$ defined as:

$$V_{trench} = 2\pi \left| \int_{R2}^{R3} \Delta n_{trench}(r) r \, dr \right|; \text{ and}$$

an outer depressed cladding immediately surrounding said depressed trench, said outer depressed cladding having (i) an outer radius R4 of between about 30 microns and 47 microns, (ii) a negative refractive index difference Δn2 with respect to said outer cladding of between about $-18 \times 10^{-3}$ and $-12 \times 10^{-3}$, and (iii) a refractive index difference with respect to said inner depressed cladding of between about $-2 \times 10^{-3}$ and $2 \times 10^{-3}$.

18. The optical fiber according to claim 17, wherein, at a wavelength of 850 nanometers, the optical fiber's overfilled launch bandwidth measured over 500 meters is at least about 90 percent of the optical fiber's overfilled launch bandwidth measured over 8 kilometers.

19. The optical fiber according to claim 17, wherein, at a wavelength of 1300 nanometers, the optical fiber's overfilled launch bandwidth measured over 500 meters is at least about 70 percent of the optical fiber's overfilled launch bandwidth measured over 8 kilometers.

20. The optical fiber according to claim 17, wherein the measured optical core size for 2 meters of the optical fiber is equal to said central core's outer radius R1 with a tolerance of ±2 microns.

21. The optical fiber according to claim 17, wherein, at a wavelength of 850 nanometers, the optical fiber has an overfilled launch bandwidth of about 1000 MHz·km or greater.

22. The optical fiber according to claim 17, wherein, at a wavelength of 1300 nanometers, the optical fiber has an overfilled launch bandwidth of about 1000 MHz·km or greater.

* * * * *